United States Patent [19]
Isshiki

[11] Patent Number: 5,673,568
[45] Date of Patent: Oct. 7, 1997

[54] APPARATUS AND METHOD FOR CONTROLLING AN AIR CONDITIONER

[75] Inventor: Masao Isshiki, Shizuoka-ken, Japan

[73] Assignee: Kabushiki Kaisha Toshiba, Kawasaki, Japan

[21] Appl. No.: 460,781

[22] Filed: Jun. 2, 1995

[30] Foreign Application Priority Data

Jun. 3, 1994 [JP] Japan .................................. 6-122797

[51] Int. Cl.$^6$ ........................................................ F24F 11/02
[52] U.S. Cl. ................................ 62/228.4; 62/163; 62/157
[58] Field of Search ............................... 62/228.4, 158, 62/163, 229, 228.1, 228.5, 157, 231, 161

[56] References Cited

U.S. PATENT DOCUMENTS

| | | | |
|---|---|---|---|
| 4,407,139 | 10/1983 | Ide et al. | 62/215 |
| 4,622,827 | 11/1986 | Jabami et al. | 62/158 |
| 4,744,223 | 5/1988 | Umezu | 62/228.4 X |
| 5,074,120 | 12/1991 | Kitamoto | 62/228.4 X |
| 5,259,211 | 11/1993 | Ikeda | 62/163 X |
| 5,295,363 | 3/1994 | Oomura et al. | 62/228.4 X |
| 5,323,619 | 6/1994 | Kim | 62/228.4 X |

FOREIGN PATENT DOCUMENTS

| | | |
|---|---|---|
| 2086617 | 5/1982 | United Kingdom . |
| 2215494 | 9/1989 | United Kingdom . |
| 2231692 | 11/1990 | United Kingdom . |
| 2260426 | 4/1993 | United Kingdom . |

*Primary Examiner*—Harry B. Tanner
*Attorney, Agent, or Firm*—Cushman, Darby & Cushman IP Group of Pillsbury Madison & Sutro LLP

[57] ABSTRACT

A method and apparatus for controlling an air conditioner having a variable speed compressor to circulate a refrigerant in a refrigerating circuit. The control apparatus and method generates a rotational speed pattern which can be directly changed by a predetermined value through a controller operable by the user. The compressor rotational speed is also based on the rotational speed used in a previous operation of the compressor to take into account the time lag occurring between the time the air conditioner is operated and the time the conditioned air is actually circulated in the room. Basing compressor speed on previous operations of the compressor minimizes large fluctuations in room temperature due to inaccuracies in temperature detection.

12 Claims, 17 Drawing Sheets

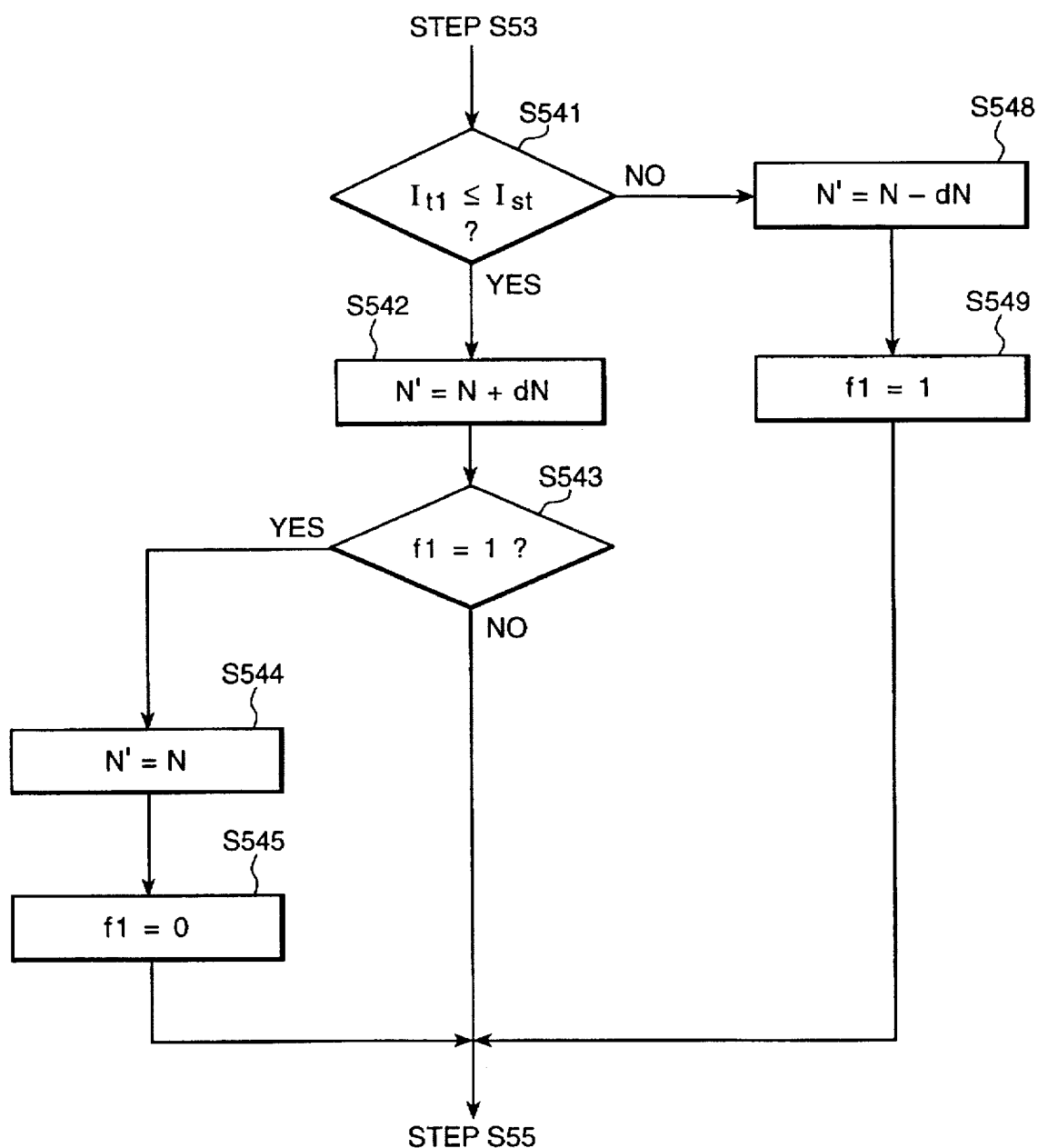

APPARATUS AND METHOD FOR CONTROLLING AN AIR CONDITIONER

BACKGROUND OF THE INVENTION

1. Field of Invention

This invention relates to an apparatus and method for controlling an air conditioner.

2. Description of Related Art

A conventional air conditioner has a room temperature sensor for detecting a room air temperature $T_a$ and a temperature setting device, such as remote control unit, for setting a desired room temperature $T_{sc}$. Such an air conditioner is controlled so that the detected room air temperature $T_a$ approaches or becomes the same as the setting room temperature $T_{sc}$.

The controlled room air temperature $T_a$ should be kept constant and equal to the setting room temperature $T_{sc}$. To achieve this purpose, an air conditioner has recently been developed having an inverter circuit for controlling the rotational speed of a compressor which is included in a refrigerating circuit. In this type of air conditioner, the rotational speed of the compressor is controlled in accordance with the temperature difference between the detected room air temperature $T_a$ and the setting room temperature $T_{sc}$. When the air conditioning load is very light, such as in a heating mode during a warm spring season or in a cooling mode during a cool autumn season, the compressor is alternately turned on and off. Ordinarily, the compressor rotational speed is selected from among a group of values, each corresponding to a different temperature difference. That is to say, a different rotational speed can be selected for each temperature difference band. In a few air conditioners, the compressor rotational speed is proportional to and varies continuously with the temperature difference.

In both types of air conditioners, the compressor rotational speed is controlled in direct response to the detected room air temperature $T_a$ when the setting room temperature $T_{sc}$ is constant. Usually, the setting room temperature $T_{sc}$ is not changed very often. Therefore, the compressor rotational speed is nearly always controlled in direct response to the detected room air temperature $T_a$.

When the air conditioner is started, the actual room air temperature $T_{aa}$ changes quickly. In this circumstance, the room temperature sensor located in a room air conditioner cannot detect the correct room air temperature $T_{aa}$. The room air temperature $T_a$ detected by the room temperature sensor has a time lag because of the air circulation patterns in the room, and/or the character of the sensor. Thus, the delay between a change of the compressor rotational speed and a change in actual room air temperature $T_{aa}$ is lengthy. Consequently, the actual room air temperature $T_{aa}$ is often quite random. For example, even though the actual room air temperature $T_{aa}$ may be close to the setting room temperature $T_s$, the room temperature sensor sometimes detects the room air temperature from a few minutes before, which is farther from the setting room temperature $T_s$. In this case, the compressor rotational speed should not change. However, the compressor rotational speed increases or decreases because the air conditioner recognizes the difference between the detected room air temperature $T_a$ and the setting room temperature $T_{sc}$. This causes a fluctuation of the actual room air temperature $T_{aa}$. Furthermore, the fluctuation is detected by the room temperature sensor. Therefore, the compressor rotational speed fluctuates based on the detected room air temperature $T_a$. As a result, the air conditioner cannot stabilize the actual room air temperature $T_{aa}$.

Moreover, the air temperature felt by a person in the room and the actual room air temperature $T_{aa}$ do not always agree. The difference between the room air temperature felt by the person and the actual room air temperature $T_{aa}$ depends on the size of the room and the amount of heat transfer within the room (the amount of heat radiation). Furthermore, the position of the person within the room causes a comparatively large difference between the actual room air temperature $T_{aa}$ and the room air temperature felt.

Also, some air conditioners control the compressor rotational speed to reduce the current consumption of the air conditioner. The current controlling operation restricts the maximum current to preventing overheating of a power socket and power lines for the air conditioner. However, the compressor rotational speed is still primarily determined by the difference between the detected room air temperature $T_a$ and the setting room air temperature $T_{sc}$.

SUMMARY OF THE INVENTION

It is an object of the invention to provide an improved method for controlling an air conditioner.

It is another object of the invention to provide stable temperature control.

It is a further object of the invention to provide a room air temperature that feels more comfortable to a person in the room.

To achieve the above objects, the present invention provides an improved apparatus and method for controlling an air conditioner having a variable speed compressor which circulates a refrigerant in a refrigerating circuit. The controlling apparatus and method generates a compressor rotational speed pattern from the time that the air conditioner is started. The generated compressor rotational speed pattern can include four modes: a) an initial rising mode in which the compressor rotational speed is increased; b) a maximum rotational speed mode in which the compressor rotational speed is kept at a first rotational speed; c) a transition mode in which the compressor rotational speed changes from the first rotational speed to a target rotational speed which is not more than the first rotational speed; and d) a target rotational speed mode in which the compressor rotational speed is kept at the target rotational speed. The apparatus and method controls the compressor rotational speed in accordance with this pattern.

BRIEF DESCRIPTION OF THE DRAWINGS

In the accompanying drawings:

FIG. 14 is a flow chart showing a detail of step S54 in FIG. 8;

DETAILED DESCRIPTION OF PREFERRED EMBODIMENT

Figure 1:
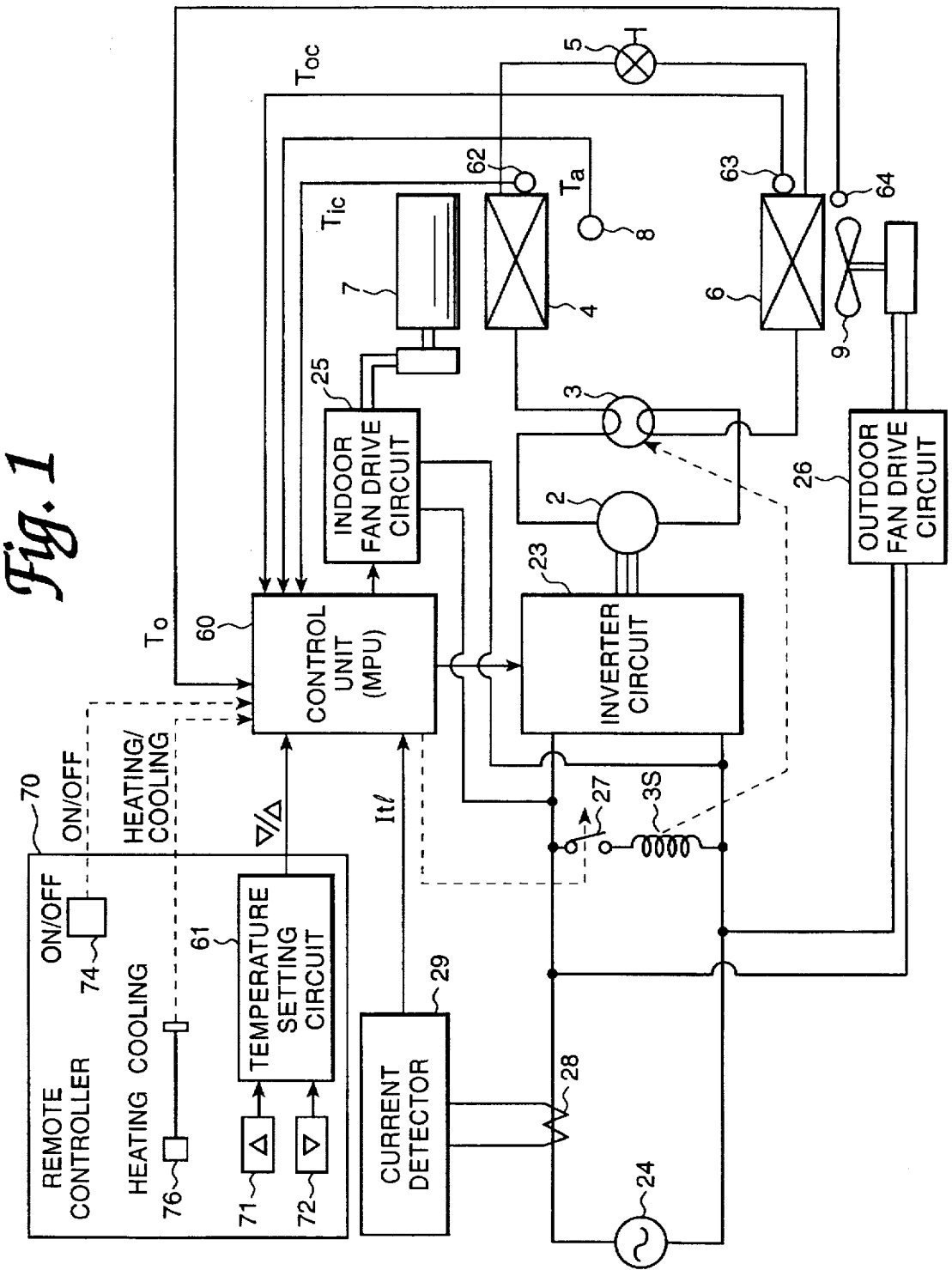
FIG. 1 is a block diagram of an air conditioner including the present invention.

A first embodiment of the present invention will be explained with reference to FIGS. 1 to 5. An air conditioner in this embodiment is a heat pump type air conditioner which can operate in a heating mode or a cooling mode.

The air conditioner has a refrigerating circuit which circulates refrigerant. The refrigerating circuit includes compressor 2, four-way valve 3, indoor heat exchanger 4, expansion valve 5 and outdoor heat exchanger 6 as shown FIG. 1. Depending on the position of four-way valve 3, a cooling or heating operation can be performed. In the cooling mode, indoor heat exchanger 4 functions as an evaporator (a cooler) while in the heating mode, indoor heat exchanger 4 functions as a condenser (a radiator). Outdoor heat exchanger 6 functions as a condenser in the cooling mode, and as an evaporator in the heating mode. A indoor fan 7 and room temperature sensor 8, for example a thermistor, are provided near indoor heat exchanger 4. Room temperature sensor 8 is in the path in which room air is sucked by indoor fan 7, before the air passes through indoor heat exchanger 4. Thus, room temperature sensor 8 can detect the room air temperature $T_a$. Outdoor fan 9 is provided near outdoor heat exchanger 6.

Compressor 2 is a sealed type compressor which includes a compressing mechanism and an AC motor in the sealed case. The compressor rotational speed is controlled by inverter circuit 23. That is, inverter circuit 23 outputs variable frequency AC power in accordance with instructions from control unit 60. Accordingly, the air conditioning capacity of the air conditioner is variable. Control unit 60 can adjust the air conditioner capacity by adjusting the compressor rotational speed. Inverter circuit 23 inputs constant frequency AC power from commercial AC power source 24. Then, inverter circuit 23 converts the input AC power to variable frequency AC power, and supplies it to the AC motor in compressor 2. Inverter circuit 23 may include a rectifier (a power rectifier) and an inverter (a power inverter) which includes a DC intermediate circuit. Alternatively, it may include a cyclo-converter which does not have a DC intermediate circuit. Furthermore, the AC motor in compressor 2 and inverter circuit 23 may be changed to a DC motor and DC inverter circuit, respectively.

Indoor fan 7, for example, a cross-flow fan, is connected to AC power source 24 via indoor fan drive circuit 25, while outdoor fan 9, for example, a propeller fan, is connected to AC power source 24 via outdoor fan drive circuit 26. The indoor fan rotational speed is controlled by indoor fan drive circuit 25, and the outdoor fan rotational speed is controlled by outdoor fan drive circuit 26. Four-way valve operating solenoid 3S is connected to power source 24 via control contact breaker point 27, which is controlled by control unit 60. Solenoid 3S is for switching four-way valve 3 to the heating position or the cooling position. Total current $I_{t1}$ flowing into the air conditioner from AC power source 24 is detected by current detector 29 which includes current transformer 28. The detection signal of current detector 29 is inputted to control unit 60 which is composed of a microprocessor (MPU) and peripheral circuits such as A/D converters.

Setting room temperature $T_{sc}$ is inputted to control unit 60 by temperature setting circuit 61 which is included in remote controller 70. Remote controller 70 includes an ON/OFF button 74, a pair of setting temperature changing (▲/▼) buttons 71, 72 and mode select switch 76 which selects the operating mode of the air conditioner (heating or cooling). When ON/OFF button 74 is pushed, remote controller 70 outputs ON/OFF instructions to control unit 60. Then, control unit 60 turns the air conditioner on or off based on the received instruction. When ▲ button 71 is pushed, a set temperature 'Raise' instruction (taken as a ▲ signal) is transmitted from remote controller 70 to control unit 60. When ▼ button 72 is pushed, a set temperature 'Lower' instruction (taken as a ▼ signal) is transmitted from remote controller 70 to control unit 60. Control unit 60 increments setting room temperature $T_{sc}$ by 1(°C.) each time it receives the ▲ signal and decrements setting room temperature $T_{ac}$ by 1(°C.) each time it receives the ▼ signal.

Indoor heat exchanger temperature sensor 62 which is attached to indoor heat exchanger 4 detects indoor heat exchanger temperature $T_{ic}$, while outdoor heat exchanger temperature sensor 63 which is attached to outdoor heat exchanger 6 detects outdoor heat exchanger temperature $T_{oc}$. Outdoor air temperature sensor 64, which is placed in an outdoor air path, detects outdoor air temperature $T_o$. Temperatures $T_{ic}$, $T_{oc}$ and $T_o$ are supplied to control unit 60 together with room air temperature $T_a$ which is detected by temperature sensor 8. Control unit 60 controls the rotational speed of compressor 2, indoor fan 4 and outdoor fan 9 in accordance with detected temperatures $T_{oc}$, $T_{ic}$, $T_o$ and $T_{oc}$, setting room temperature $T_{sc}$ and detected current $I_{t1}$. The control operation of control unit 60 is stored in a memory as a program. The detailed functions of control unit 60 are described later. Indoor heat exchanger 4, indoor fan 7, indoor fan drive circuit 25, temperature sensors 8, indoor heat exchanger temperature sensor 62 and control unit 60 are included in an indoor unit placed in the room to be air conditioned, and the major part of the other equipment is included in an outdoor unit placed outside the room.

Figure 2:
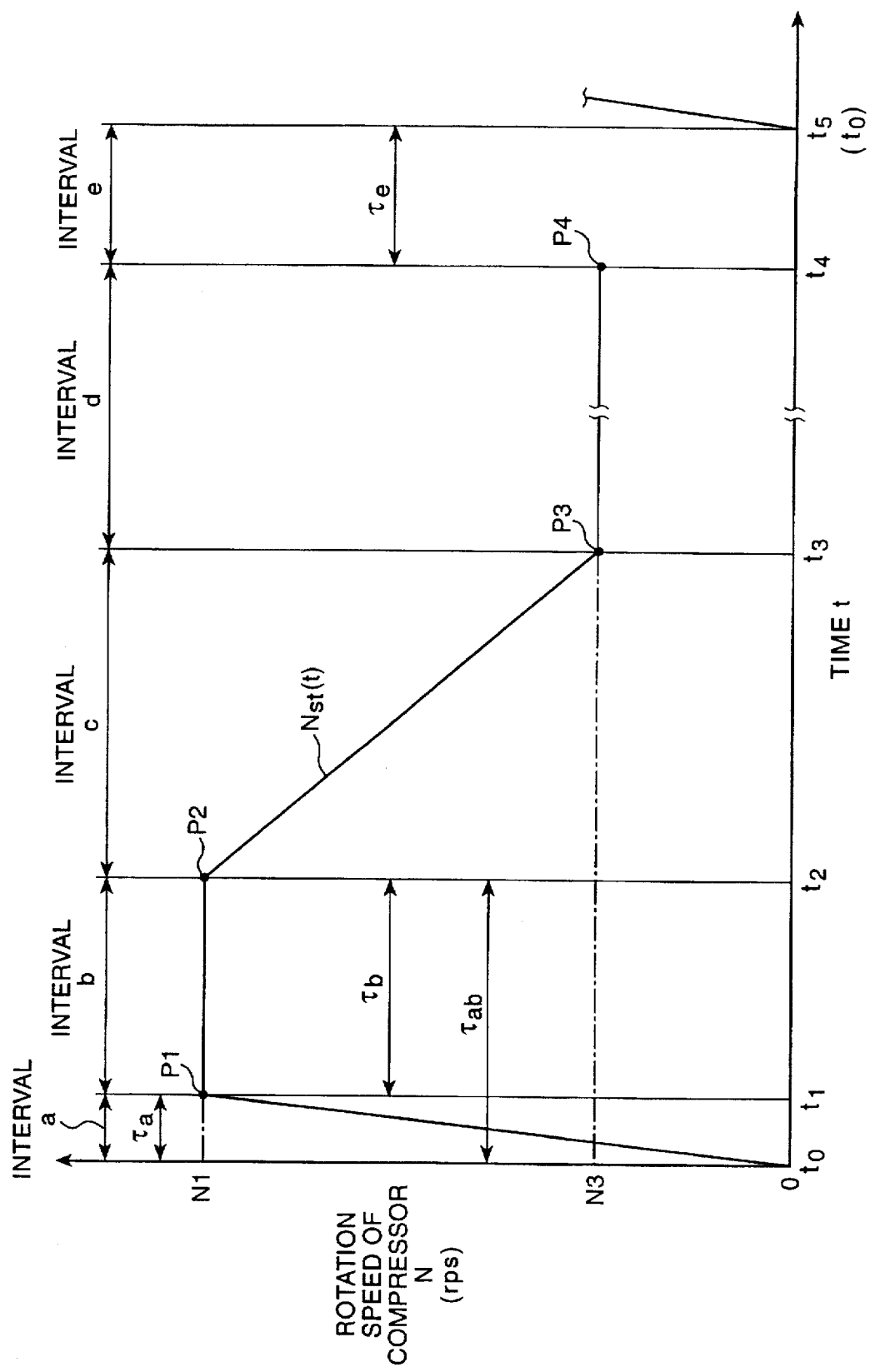
FIG. 2 is a graph showing one example of a compressor rotational speed pattern generated by the present invention.

FIG. 2 shows the compressor rotational speed pattern during the time period from when the air conditioner starts to when it stops according to a first embodiment of this invention. In FIG. 2, the horizontal axis is time t, and the vertical axis is the rotational speed N of compressor 2 in the refrigerating circuit of the air conditioner. The air conditioner uses an AC motor and AC inverter circuit 23. Thus, there is a slip between the frequency outputted from inverter circuit 23 and the compressor rotational speed. However, the slip is usually small, and hardly influences the air conditioner capacity (performance). Therefore, rps units (revolutions/second) used in this specification can also relate to the output frequency of inverter circuit 23. When a DC motor and a DC inverter circuit are used, it has no slip, thus, the compressor rotational speed is exactly equal to the output frequency of the DC inverter circuit.

The air conditioner starts to operate, that is, the rotation of compressor 2 starts, at time $t=t_0$. After that, the period until $t=t_1$ (interval a shown in FIG. 2) is a rising mode interval. In the rising mode interval, the compressor rotational speed N rises linearly to maximum rotational speed N1, and reaches operation changing point P1 ($t_1$, N1). From there, the interval to $t=t_2$ (interval b shown in FIG. 2) is a maximum rotational speed mode interval. In the maximum rotational speed mode interval, maximum rotational speed N1 is maintained until operation changing point P2 ($t_2$, N1). From operation changing point P2, the interval to $t=t_3$ (interval c) is a transition mode interval in which the compressor rotational speed changes to the target rotational speed. In the transition mode interval c, the compressor rotational speed is reduced approximately linearly at a specified rate of decrease to target rotational speed N3 which is selected in response to a learned result which is described later. The transition mode is finished at operation changing point P3 ($t_3$,N3) at which the compressor rotational speed N reaches initial target rotational speed N3. The interval from operation changing point P3 until $t=t_4$ (interval d) is a stable mode interval. The compressor rotational speed N matches the target rotational speed until the operation of the air conditioner is stopped. In FIG. 2, at operation changing point P4($t_4$,P4), the operation is stopped in response to the OFF instruction from remote controller 70. Therefore, at $t=t_4$, N=0, that is to say, the compressor stops its rotation. The interval from the time operation stops ($t=t_4$) until the next start of operation ($t=t_5$) (interval e) is counted as the operation stopped time period $\tau_e$ ($=t_5-t_4$). Rotational speed pattern $N_s(t)$ which passes through changing points P1 to P4 is formed in the above way.

Figure 3:
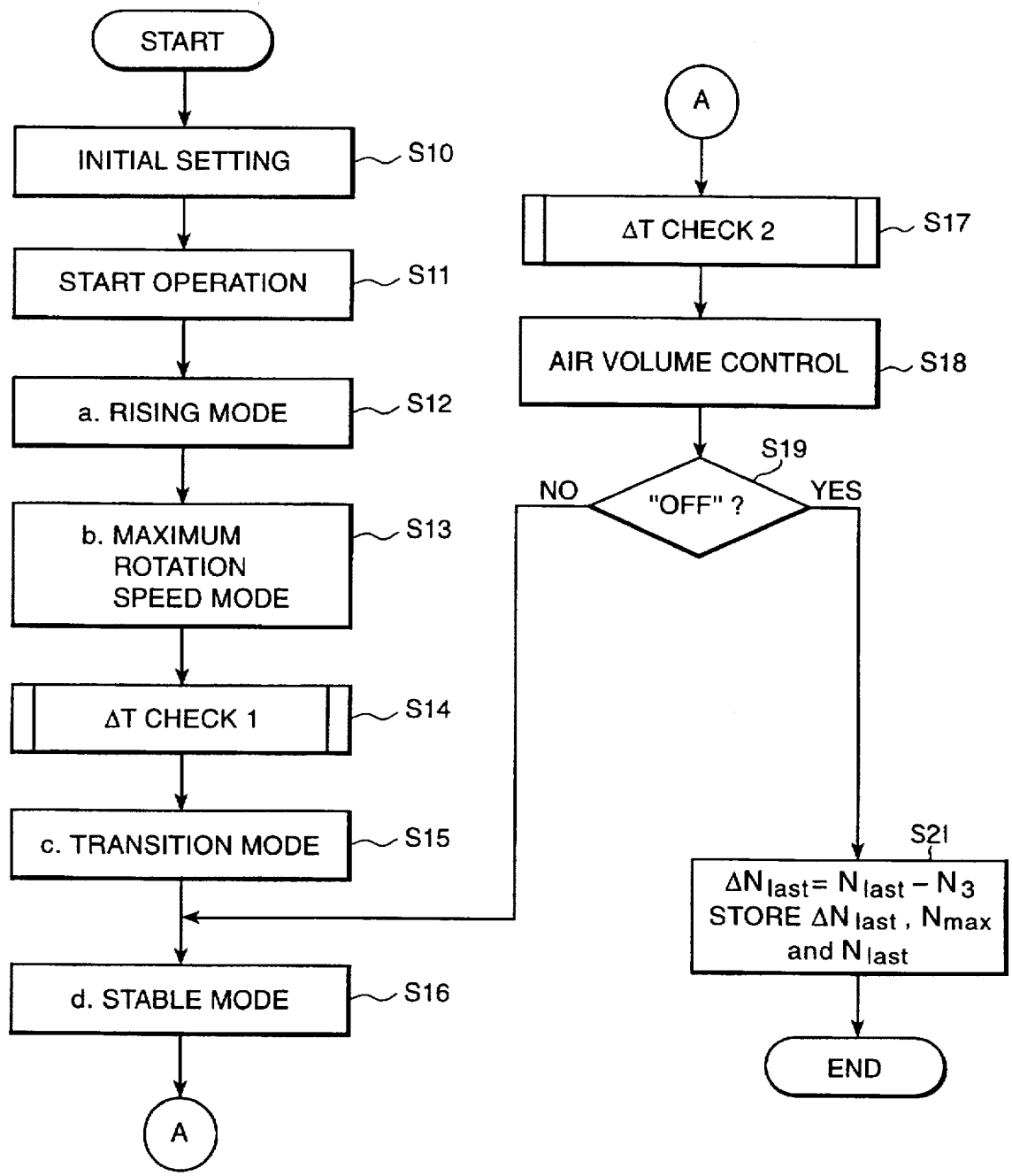
FIG. 3 is a flow chart showing the sequence for the operating pattern shown in FIG. 2.

FIG. 3 is a flow chart showing the operation of this invention. The basic concept of the control modes in this flow-chart is that, during starting, the initial setting (step S10) is performed by adding a learned result of previous operations which is described later. At this time, the compressor rotational speed N and all operation changing points P1, P2 and P3 are determined in accordance with the previous operation data. Therefore, a first initial setting for operation changing points P1, P2 and P3 is required at the first operation after installation. For example, the first initial setting values are as follows:

Operation changing point P1 ($t_1$, N1)

During heating mode, N=N1=120 rps, $t_1$=5 min

During cooling mode, N=N1=80 rps, $t_1$=5 min

Operation changing point P2 ($t_2$,N1)

During heating mode, N=N1=120 rps, $t_2-t_1$=15 min

During cooling mode, N=N1=80 rps, $t_2-t_1$=15 min

Operation changing point P2 ($t_2$,N1)–P3 ($t_3$,N3)

During heating mode, speed reduction rate 4 rps/min,

N=N3=40 rps

During cooling mode, speed reduction rate 2.5 rps/min,

N=N3=30 rps

The result of the above is that, both during heating and cooling modes, $t_3-t_2$=20 min Operation changing point P4 ($t_4$,N3)

During heating mode, N=N3=40 rps

During cooling mode, N=N3=30 rps

In the above first initial setting, N1, N3 and $t_1$ to $t_3$ can be changed.

At the next operation, these data, N1 to N3 and $t_1$ to $t_3$, except the speed reduction rate during heating and cooling mode would be corrected by adding the learned results during previous operations. Only the speed reduction rate during the heating and cooling modes is not changed, but is kept constant. If the first initial setting is wrong, during the following several operations, the air conditioner can automatically determine preferable values.

The correction based on the previous operations will be explained. The correction uses also outdoor air temperature $T_o$ which is detected by the outdoor air sensor 63 to determine maximum rotational speed N1, target rotational speed N3 and maximum rotational speed operating time $\tau_b=t_2-t_1$. These factors are initially set as follows.

Maximum rotational speed: $N1=(N_{last})\times(g(\tau_e, T_o))$

Target rotational speed: $N3=N_{last}+\Delta N_{last}+f(T_o)$

Maximum rotational speed operating time: $\tau_b=\tau_b+h(\tau_e, \Delta N_{last})$ Here, last rotational speed $N_{last}$ is the rotational speed corresponding to the last rotational speed at the end of the previous operation. The coefficient $g(\tau_e, T_o)$ is a coefficient determined as a function of the time $\tau_e=t_5-t_4$, from the previous time operation stopped to the present time operation started, and the external air temperature $T_o$. The greater the value of $\tau_e$, the greater the function $g(\tau_e, T_o)$ becomes. As the value of $T_o$ increases, the value of the function $g(\tau_e, T_o)$ becomes smaller during heating, and the value of the function $g(\tau_e, T_o)$ becomes greater during cooling. $\Delta N_{last}$ is a rotational speed variation value during stable mode interval d during the previous operation. $f(T_o)$ is a coefficient expressed as a function of outdoor air temperature $T_o$. The greater the value of $T_o$, the smaller the value $f(T_o)$ has when heating and the greater the value $f(T_o)$ has when cooling. $\tau_b$ is the time period of maximum rotational speed during the previous operation. $h(\tau_e, \Delta N_{last})$ is a coefficient expressed as a function of time period $\tau_e$ and rotational speed variation amplitude $\Delta N_{last}$. For example, $f(T_o)=L\times C_1\times(T_o-A)$; $g(\tau_e, T_o)=C_1\times(\tau_e-B)+L\times C_2\times(T_o-A)$; $h(\tau_e, \Delta N_{last})=C_3\times(\tau_e-B)+L\times C_4\times(\Delta N_{last})$, wherein variable L=+1 during cooling, L=–1 during heating, $C_1$, $C_2$, $C_3$ and $C_4$ are constant, A=15(C°) and B=3(hours) can be used.

After initial setting has been performed in this way, the air conditioner is started (step S11). After starting, a: the rising mode, which is the interval a shown in FIG. 2 (step S12) and b: the maximum rotational speed mode, which is interval b shown in FIG. 2 (step S13) are executed. Then, the temperature difference $\Delta T=T_a-T_{ac}$ is checked (step S14, details described later). After checking, c: the transition mode, which is interval c shown in FIG. 2 (step S15) and d: the stable mode, which is interval d shown in FIG. 2 (step S16) are executed.

In the stable mode, the temperature difference $\Delta T=T_a-T_{sc}$ is checked again (step S17, details described later), and air volume is controlled (step S18). As a result, the volume of air blown from indoor heat exchanger 4 is controlled in accordance with the indoor heat exchanger temperature $T_{ic}$. As long as the OFF instruction is not inputted from remote controller 70 (step S19: "NO"), that is a user has not pushed ON/OFF button 74, the program returns to step S16. When the answer in step S19 is "YES", that is, the OFF instruction has been inputted from remote controller 70, in step S21 a calculation of an equation $\Delta N_{last}=N_{last}-N_3$ is carried out. Then, the program prepares and stores rotational variation $\Delta N_{last}$ and $N_{last}$ for the next operation, and stops operation. Rotational variation $\Delta N_{last}$ is used for the initial setting at the next start of operation as rotational speed correction value $\Delta N_{last}$. In the equation, $N_3$ is the initial target rotational speed which is set in step S10. When the operation stops, the time period from stopping (moment $t_4$) to the start of the next operation (moment $t_5$), that is the operation stopped time period $\tau_e$ immediately before the next operation, is measured. The operation stopped time period $\tau_e$ is also used for the initial setting at the next operation.

Figure 4:
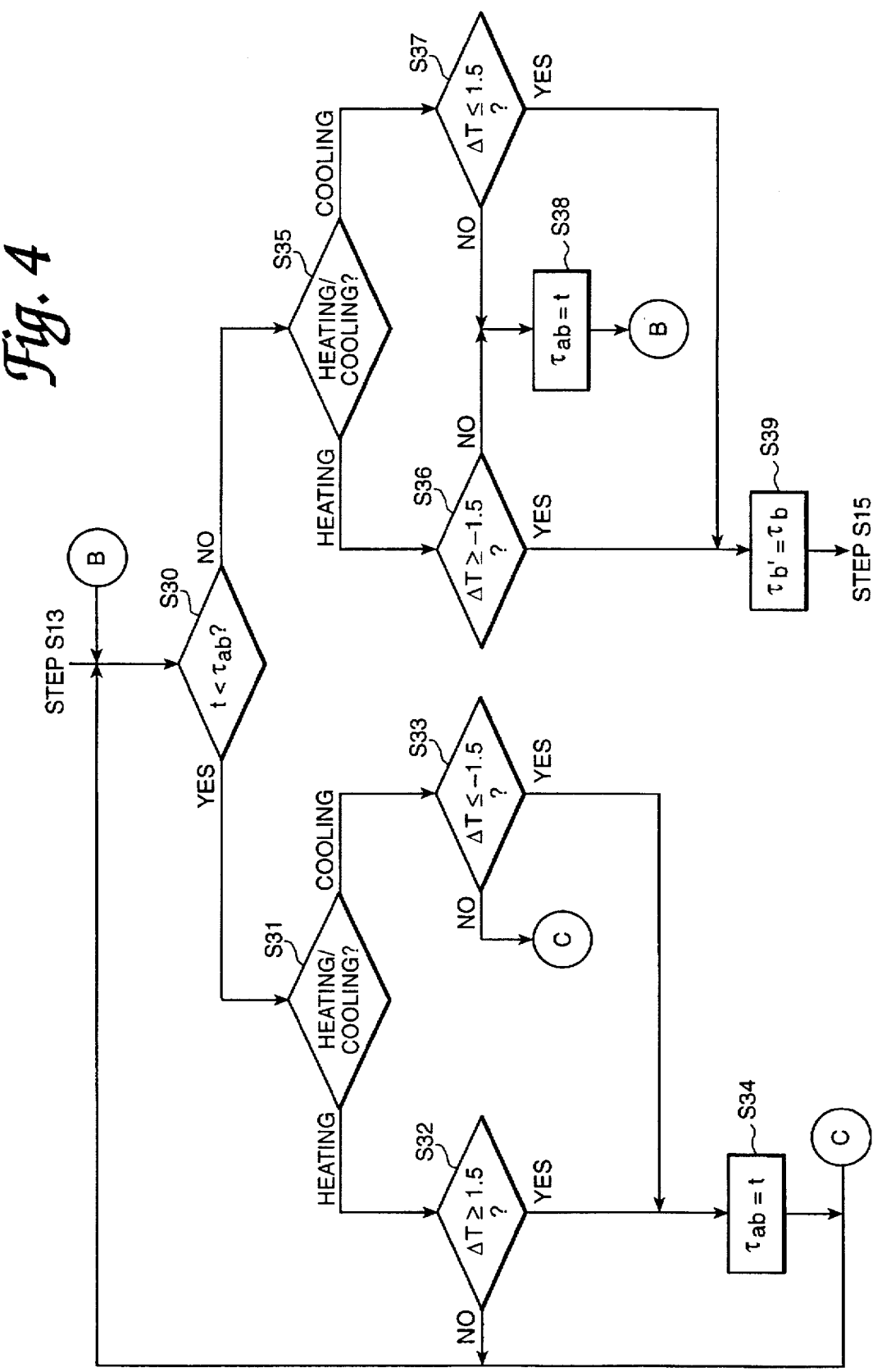
FIG. 4 is a flow chart showing a detail of step S14 in FIG. 3.

The sub-routine for checking temperature difference $\Delta T$, which is performed in step S14, will be described with reference to FIG. 4. This sub-routine is a routine which adjusts time period $\tau_a + \tau_b = \tau_{ab} = t_2 - t_0$ in relation to temperature difference $\Delta T$. In other words, during intervals a and b, until learning is completed, room air temperature $T_a$ will fluctuate greatly, since the air conditioning is at maximum capacity. Therefore, upper and lower limit restrictions prevent room air temperature $T_a$ from fluctuating too far from the setting room temperature.

At step S30, time t from starting operation is compared with $\tau_{ab}$. If $t<\tau_{ab}$, the program checks whether the operation mode of the air conditioner is heating or cooling (step S31). In the heating mode, whether $\Delta T(=T_a-T_{sc})\geq 1.5(°C.)$ is judged (step S32). On the other hand, in the cooling mode, whether $\Delta T\leq-1.5(°C.)$ is judged (step S33). If $\Delta T\geq 1.5(°C.)$ in the heating mode or if $\Delta T\leq-1.5(°C.)$ in cooling mode, the air conditioner has operated too long at maximum speed. Therefore, an adjustment $\tau_{ab}=t$ is made (steps S32, S33 and S34), and the program returns to step S30 in order to enter interval c (the transition mode). After $\tau_{ab}$ has been set to time t, the next time that step S30 is performed, the answer becomes "NO", and the program goes to step S35. If $\Delta T<1.5(°C.)$ in step S32, or if $\Delta T>-1.5(°C.)$ in step S33, the air conditioner has not operated too long at maximum speed. Therefore, the program returns as it stands to step S30 and repeats steps S30 to S34 until $t\geq\tau_{ab}$.

In step S30, if $t\geq\tau_{ab}$, that is to say if the passage of preset maximum rotational speed operation time $\tau_{ab}$ is confirmed, the program checks whether the air conditioner is in the heating or cooling mode (step S35). Then, if $\Delta T<-1.5(°C.)$ in the heating mode or if $\Delta T>1.5(°C.)$ in the cooling mode, the air conditioning is deemed "insufficient" for the setting room temperature $T_{sc}$. Therefore, the set time $\tau_{ab}$ is changed to the operating time t at that point, so that $\tau_{ab}=t$ (steps S36, S37 and S38). Then, the program returns to step S30, and repeats steps S30 to S38. If $\Delta T\geq-1.5(°C.)$ in step S36 or $\Delta T\leq 1.5(°C.)$ in step S37, the respective heating or cooling is deemed "sufficient". Therefore, the operating time period $\tau_{ab}$ at maximum rotational speed which will be used at the next operation is stored as $\tau_b'=\tau_b$ (step S39), and the program exits this subroutine and moves to step S15.

That is, in the cooling mode, during $\tau_{ab}$, when the difference between detected room air temperature $T_a$ and setting room temperature $T_{sc}$, or $\Delta T$, becomes less than $-1.5(°C.)$, or after $\tau_{ab}$, the difference $\Delta T$ becomes less than $1.5(°C.)$, the maximum rotational speed mode is finished and operating time period $\tau_{ab}$ and maximum rotational speed $N_{max}$ during operating time period $\tau_{ab}$ are stored for the next operation. Similarly, in the heating mode, during $\tau_{ab}$, when the difference $\Delta T$ becomes more than $1.5(°C.)$, or after $\tau_{ab}$, the difference $\Delta T$ becomes more than $-1.5(°C.)$, the maximum rotational speed mode is finished and operating time $\tau_{ab}$ is stored for the next operation. In each operation mode, except for the conditions specified above, the maximum rotational speed mode is continued.

Figure 5:
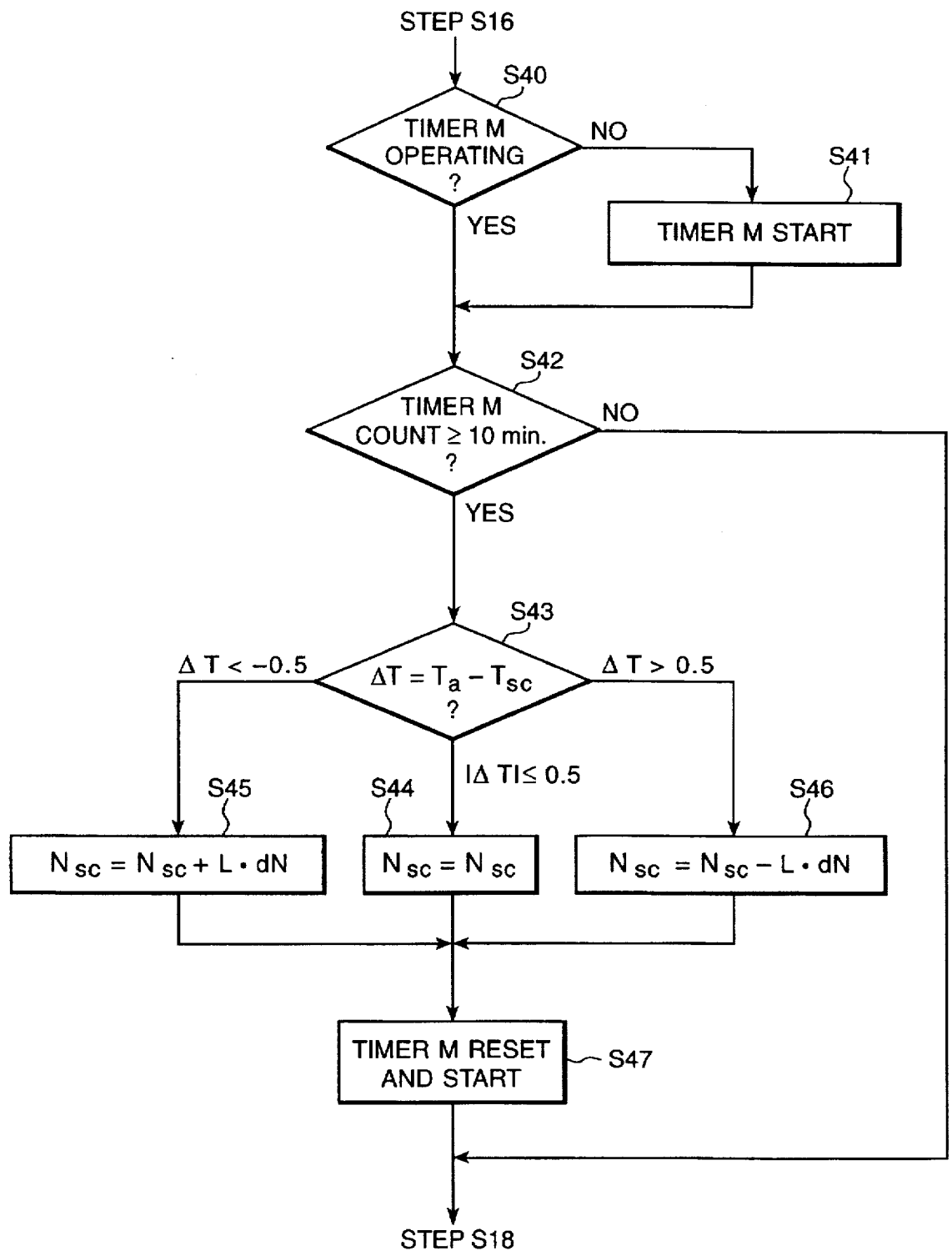
FIG. 5 is a flow chart showing a detail of step S17 in FIG. 3.

The detail of the sub-routine of step S17 which checks temperature difference $\Delta T$ during the stable mode interval d will be explained with reference to FIG. 5. This sub-routine is a routine which adjusts compressor rotational speed N in relation to the air conditioning effect. This adjustment is performed at predetermined intervals. The predetermined interval is determined by timer M which is included in control unit 60. The program checks whether timer M is operating (step S40). When this sub-routine is first entered, timer M is not in operation, thus, timer M is started (step S41). Then, the program judges whether timer M has passed a specified time, for example 10 minutes (step S42). If 10 minutes has elapsed, the program corrects rotational speed based on temperature difference $\Delta T$ in steps S43 to S46. If timer M has not counted 10 minutes, the program goes to step S18.

To correct rotational speed based on temperature difference $\Delta T$, the program checks whether $|\Delta T|\leq 0.5(°C.)$, that is whether $-0.5(°C.)\leq\Delta T\leq 0.5(°C.)$ (step S43). If $|\Delta T|\leq 0.5(°C.)$, it means that room air temperature $T_a$ is in the correct temperature zone which is approximately the setting room temperature $T_{sc}$. Therefore, rotational speed adjustment is not required. Therefore, rotational speed instruction value $N_{sc}$ is taken as $N_{sc}=N_{sc}$ (step S44) and the program goes to step S47.

If $|\Delta T|>0.5(°C.)$, that is $\Delta T<-0.5$ or $\Delta T>0.5$, the program adjusts the rotational speed instruction value $N_{sc}$. The adjustment differs according to whether the air conditioner is operating in a heating mode or a cooling mode. Therefore, variable L which indicates the operation mode, L=+1 in the heating mode, and L=-1 in the cooling mode, is used. Then, if $\Delta T<-0.5$, the program performs the process of $N_{sc}=N_{sc}+L\times dN$, that is to say, $N_{sc}=N_{sc}+dN$ in the heating mode, and $N_{sc}=N_{sc}-dN$ in the cooling mode (step S45). In heating mode, $\Delta T<-0.5(°C.)$ represents a shortage of air conditioning capacity. Thus, the air conditioning capacity is increased by increasing the compressor rotational speed. While, in cooling mode, $\Delta T<-0.5(°C.)$ represents an excess in air conditioning capacity. Thus, the air conditioning capacity is decreased by decreasing the compressor rotational speed. In the adjustment, dN is the unit step amplitude of the compressor rotational speed, usually between 2 and 4 rps. In this embodiment, dN=4 rps is used during heating and dN=2.5 rps is used during cooling. Then, the program goes to step S47.

If $\Delta T>0.5(°C.)$ in step S43, the program performs the process of $N_{sc}=N_{sc}-L\times dN$, that is to say, $N_{sc}=N_{sc}-dN$ during heating, and $N_{sc}=N_{sc}+dN$ during cooling (step S46), and goes to step S47. This step S46 is the opposite of step S45. In the heating mode, $\Delta T>0.5(°C.)$ represents an excess in air conditioning capacity. Thus, the air conditioning capacity is decreased by decreasing the compressor rotational speed. In the cooling mode, $\Delta T>0.5(°C.)$ represents a shortage of air conditioning capacity. Thus, the air conditioning capacity is increased by increasing the compressor rotational speed.

After steps S43 to S46, timer M is reset and re-started (step S47). Then the program exits this sub-routine and goes to step S18.

When the next air conditioner operation starts after the air conditioner has been stopped, in the initial setting step S10, the above described initial setting is carried out. That is the following calculations are executed:

Maximum rotational speed: $N1=(N_{last})\times(g(\tau_e, T_o))$

Target rotational speed: $N3=N_{last}+\Delta N_{last}+f(T_o)$

Maximum rotational speed operating time: $\tau_b'=\tau_b+h(\tau_e, \Delta N_{last})$ If the room which is air conditioned by the air conditioner is larger than would be ideal for the first initial setting, the rotational speed variation value $\Delta N_{last}$ and the last rotational speed $N_{last}$ would be great. Therefore, N1 and N3 become greater for the next operation. Furthermore, steps S36–S38 cause $\tau_b$ to become greater. Therefore, in the embodiment described above, the air conditioner can be set automatically according to the conditions in the room and the users' preferred setting room temperature. The compressor rotational speed pattern can be automatically adjusted in response to the previous operation. Therefore, comfortable air conditioner operation can be performed for every individual in various environments.

Figure 6:
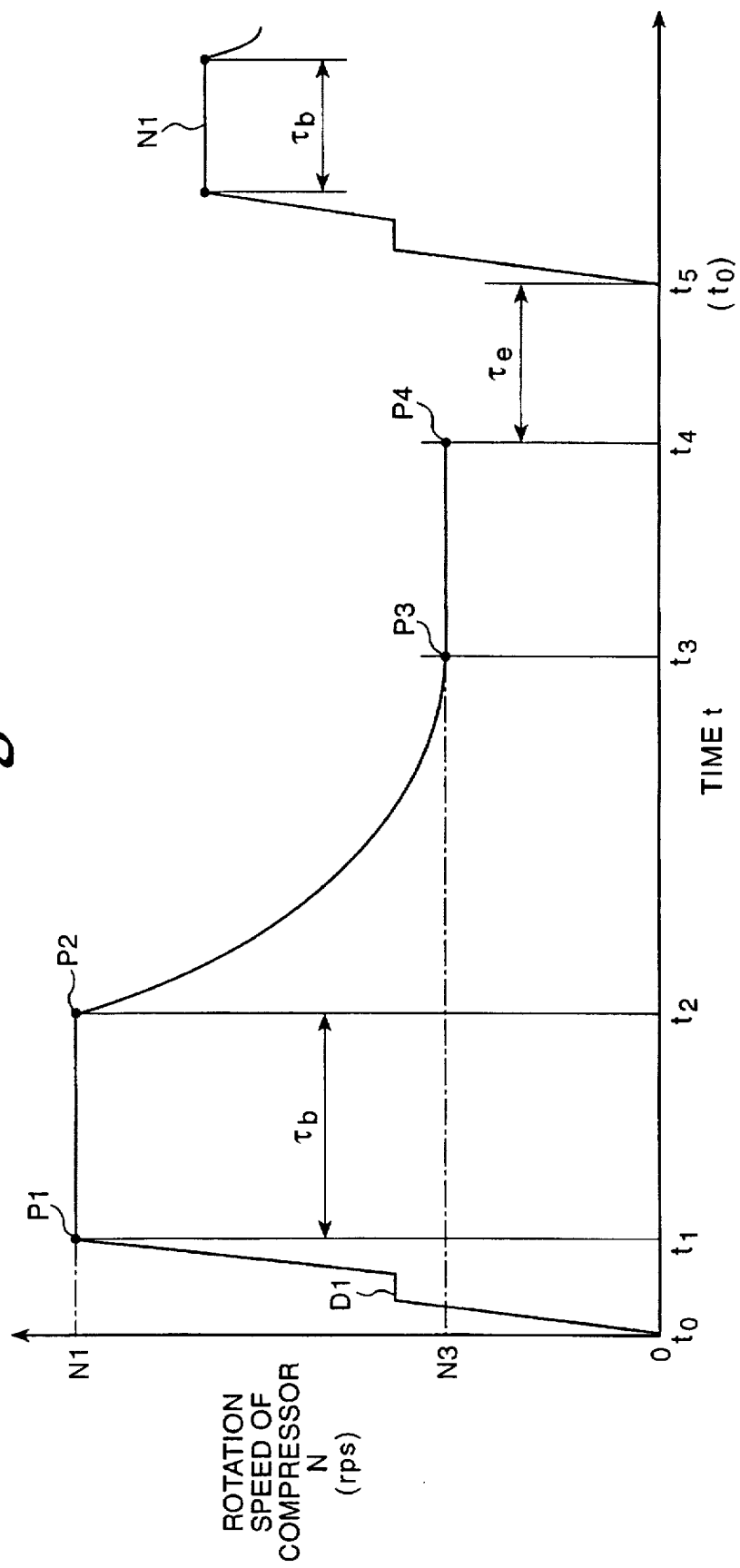
FIG. 6 is a graph showing another example of a compressor rotational speed pattern generated by the present invention.

FIG. 6 shows a different compressor rotational speed pattern from that in FIG. 1. In FIG. 6, in the middle of the rising mode interval $(t_o-t_1)$, constant rotational speed interval D1 is set at a point where the compressor rotational speed is slightly higher than target rotational speed N3. Also, in the transition mode interval $(t_2-t_3)$, the reduction of rotational speed is not at a constant rate. It is shifted exponentially toward operation changing point P3. Also, in this case, operation changing point P3 is not determined based on time. The speed is reduced following a specified functional curve, and P3 is determined based on the moment when the compressor rotational speed N is reduced to the specified value (N3) as a result of that speed reduction.

When the period that operation is stopped, $\tau_e$, is short, the influence of the previous air conditioning operation remains to a great extent. Conversely, when time $\tau_e$ is long, hardly any influence of the previous air conditioning remains. Furthermore, the influence of external air temperature $T_o$ is added to the degree of influence of operation stopped time $\tau_e$. This functional expression is set as $g(\tau_e, T_o)$. Therefore, maximum rotational speed N1 at the time the air conditioner is restarted is corrected by the calculation $N1=(N_{last})\times(g(\tau_e, T_o))$. As a result, it is possible to prevent wasteful energy consumption when re-starting the air conditioner, particularly when operation stopped time $\tau_e$ is short. FIG. 6 shows an example of the pattern in such a case from $t=t_5$. For $t>t_5$, a maximum rotational speed N1 is set which is smaller than the previous maximum rotational speed $N_1$. Also, maximum rotational speed operation time $\tau_b$ is set which is shorter than that according to operation stopped time $\tau_e$.

Referring now to FIGS. 1 and 7 to 18, another embodiment will be described which controls the current drawn by the air conditioner. Total current $I_{t1}$ drawn by the air conditioner is mainly composed of the current of the compressor motor for driving compressor 2. The compressor rotational speed is almost directly proportional to the current drawn by the compressor motor. Therefore, the compressor rotational speed N, that is the air conditioning capacity, can be controlled by controlling the current of the compressor motor or the total current $I_{t1}$ of the air conditioner.

This embodiment uses a current pattern instead of a rotational speed pattern of the compressor. The current of the compressor motor is controlled so that the total current $I_{t1}$ of the air conditioner follows the current pattern. Thus, the compressor rotational speed is indirectly controlled so that the compressor rotational speed changes similarly with the current pattern. The controlling actions and effects are similar to the above described control based on the rotational speed pattern.

Figure 7:
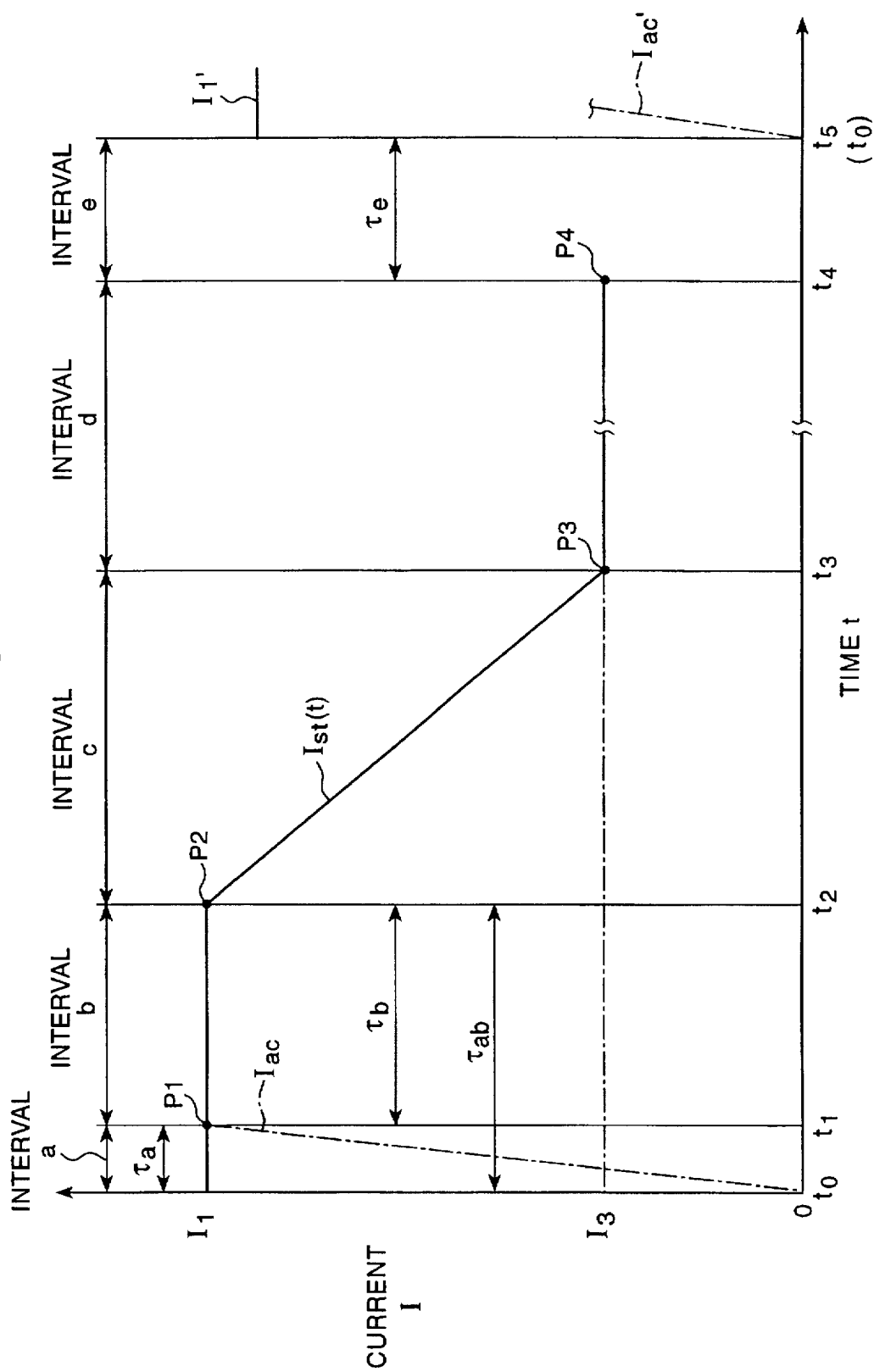
FIG. 7 is a graph showing a pattern of compressor current generated by the present invention.

FIG. 7 shows the current pattern $I_{sr}(t)$ which is set as a function of time t. As shown in FIG. 7, the configuration of this current pattern is very similar to the configuration of rotational speed reference operating pattern $N_{sr}(t)$ (shown in FIG. 2). The current pattern $I_{sr}(t)$ and total current $I_{t1}$, which is detected by current detector 29 in FIG. 1, are compared. Then, the compressor rotational speed is controlled so that total current $I_{t1}$ is almost equal to but does not exceed current pattern $I_{sr}(t)$. As shown in FIG. 7, at time $t=t_o$ to the air conditioner starts to operate. Total current $I_{t1}$ is controlled so that it gradually increases from 0 toward maximum current value $I_1$ during the time until $t=t_1$ (interval a: the rising mode interval). Therefore, the compressor rotational speed N is increased. After total current $I_{t1}$ has reached $I_1$, total current $I_{t1}$ is kept at instructed current $I_1$ during the interval until $t=t_2$ (interval b: the maximum current mode interval). Accordingly, in the interval b, the compressor rotational speed N is kept constant. At $t=t_2$, operation changing point P2 $(t_2, I_1)$ is reached. The interval from that point until $t=t_3$ (interval c: the transition mode) is the interval in which the current decreases approximately linearly at a specified rate of reduction ($\Delta I/\Delta \tau$) to target current $I_3$. As a result, the compressor rotational speed N is decreased at a specific rate of reduction corresponding to ($\Delta I/\Delta \tau$). Operation changing point P3 $(t_3, I_3)$ is achieved when the current reaches the initial target current $I_3$ at $t=t_3$ after time $\tau_c=(I_1-I_3)\times(\Delta \tau/\Delta I)$. The interval from operation changing point P3 until $t=t_4$ (interval d: the stable mode interval) is the interval in which normal operation is continuous based on the target current. In the stable mode interval, as long as the air conditioning load does not change greatly, the compressor rotational speed N is not changed. At $t=t_4$, operation is stopped by the OFF instruction which is transmitted from remote controller 70. Thus, at operation changing point P4$(t_4, I_3)$, compressor 2, indoor and outdoor fan 7, 9 and other electrical parts of the air conditioner are de-energized and total current $I_{t1}$ becomes 0.

The interval (interval e) from the operation stopping point $(t=t_4)$ until the next operation starting point $(t=t_5(t_o))$ is counted as operation stopped time $\tau_e=t_5-t_4$, used to determine the initial setting when the next operation starts.

Figure 8:
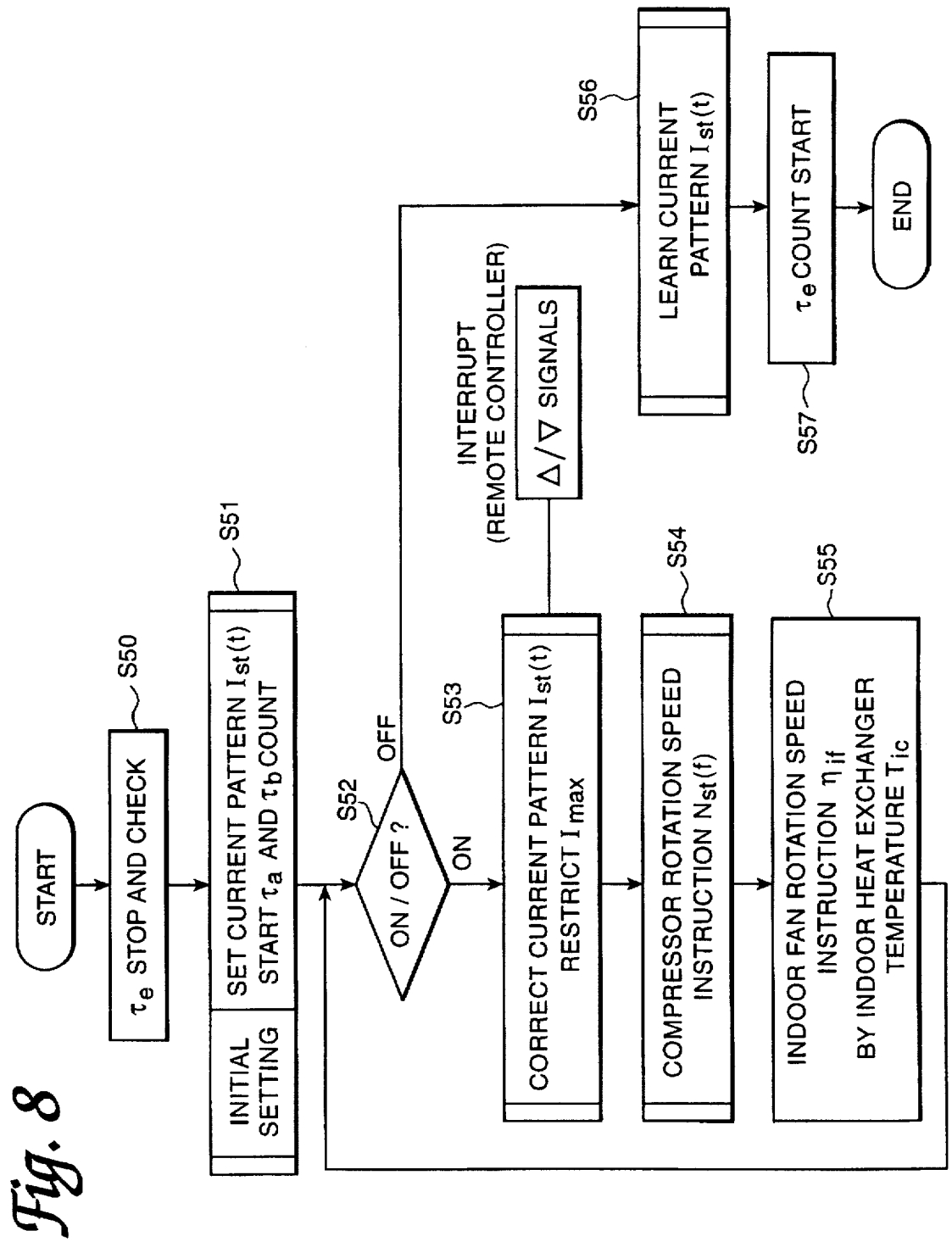
FIG. 8 is a flow chart showing the sequence for controlling a compressor of an air conditioner according to the current pattern shown in FIG. 7.
Figure 9:
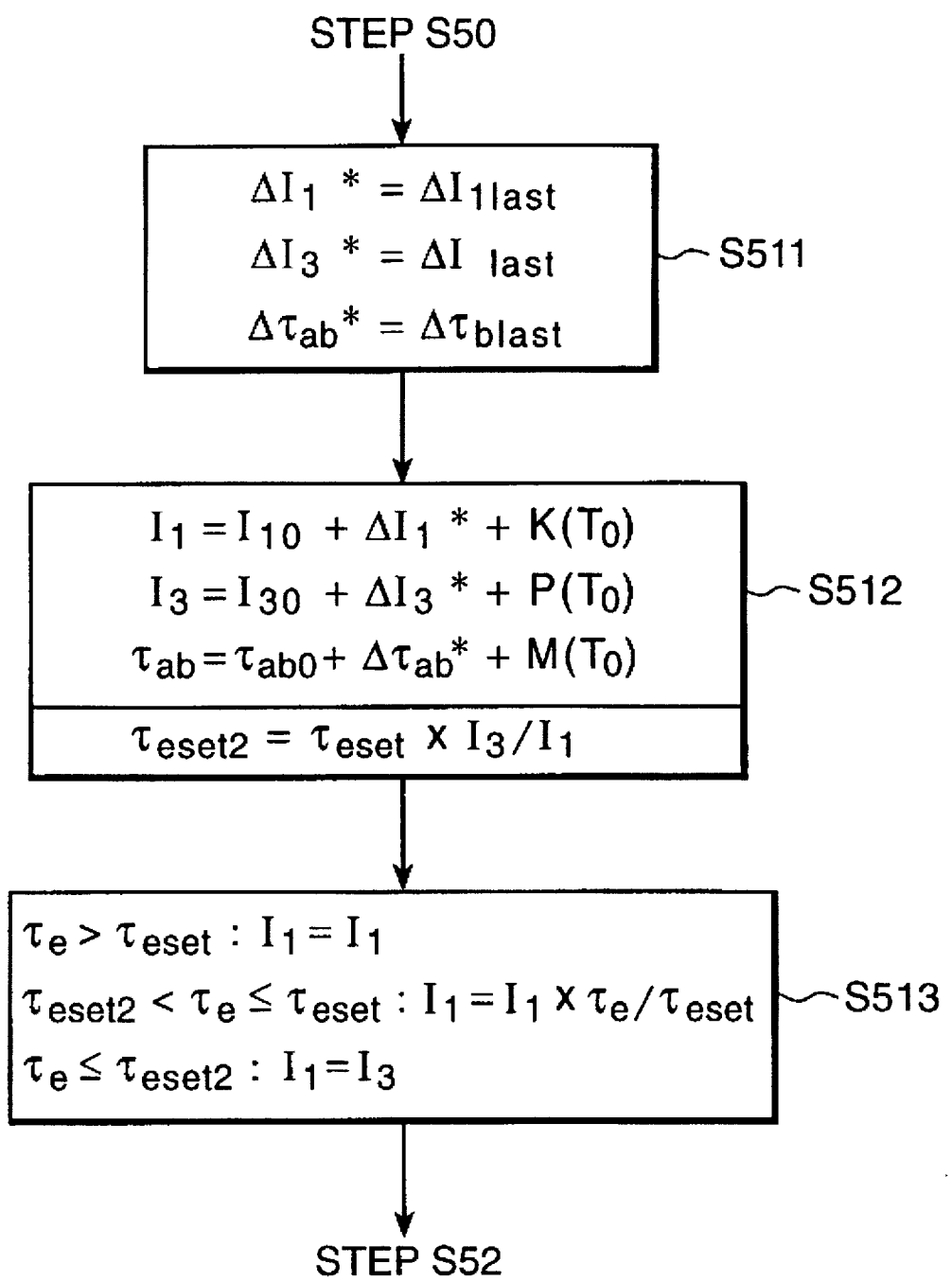
FIG. 9 is a flow chart showing a detail of step S51 in FIG. 8.

FIG. 8 is a flow-chart showing the operation of this air conditioner. When operation is switched ON, that is ON/OFF button 74 is pushed while the air conditioner is stopped, the counting of $\tau_e$, which had been started at the end of the previous operation of the air conditioner, is stopped. Then, time $\tau_e$ is checked and stored (step S50). After that, the initial setting for current pattern $I_{sr}$ (t) is determined. The total time $\tau_{ab}$ $(=\tau_a+\tau_b)$ which is the amount of time of interval a and interval b is calculated, and the count is started (step S51). The initial setting of current pattern $I_{sr}$ (t) means that the variations with time of the current pattern value, as shown in FIG. 7, are determined. The details of the initial setting process in step S51 are shown in FIG. 9.

Firstly, first correction values for currents $I_1$ and $I_3$ and for time $\tau_b$ are determined (step S511) from the following equations:

$$\Delta I_1{}^*=\Delta I_{1last}$$

$$\Delta I_3{}^*=\Delta I_{3last}$$

$$\Delta \tau_{ab}{}^*=\Delta \tau_{blast}$$

Then, the corrections are added in accordance with the following equations:

$$I_1=I_{10}+\Delta I_1{}^*+k(T_o)$$

$$I_3=I_{30}+\Delta I_3{}^*+p(T_o)$$

$$\tau_{ab}=\tau_{abo}+\Delta \tau_{ab}{}^*+m(T_o)$$

$$\tau_{eset2}=(\tau_{eset})\times(I_3/I_1)$$

In the above equations, suffix "*" indicates the present value, suffix "$_o$" is the original value, and this is a predetermined fixed initial value, and suffix "$_{last}$" is the learned and stored value from the previous operation. The setting of the learned and stored values $\Delta I_{1last}$, $\Delta I_{3last}$ and $\tau_{blast}$ is described later. "$\tau_{eset}$" is a fixed period that approximates the time that it takes for the room air temperature $T_a$ to decrease to the external air temperature $T_o$ after the air conditioner is stopped. $\tau_{eset}$ is set at, for instance, about 3 hours so that room air temperature $T_a$ at the time of the next operation of the air conditioner does not greatly exceed the setting room temperature $T_{sc}$. "$\Delta$" expresses a variation or correction value. "$k(T_o)$", "$p(T_o)$" and "$m(T_o)$" are adjustment terms relating to external air temperature $T_o$. Thus, each of $k(T_o)$, $p(T_o)$ and $h(T_o)$ is a coefficient expressed as a function of outdoor air temperature $T_o$ which is detected by outdoor air temperature sensor 64.

Figure 10A:
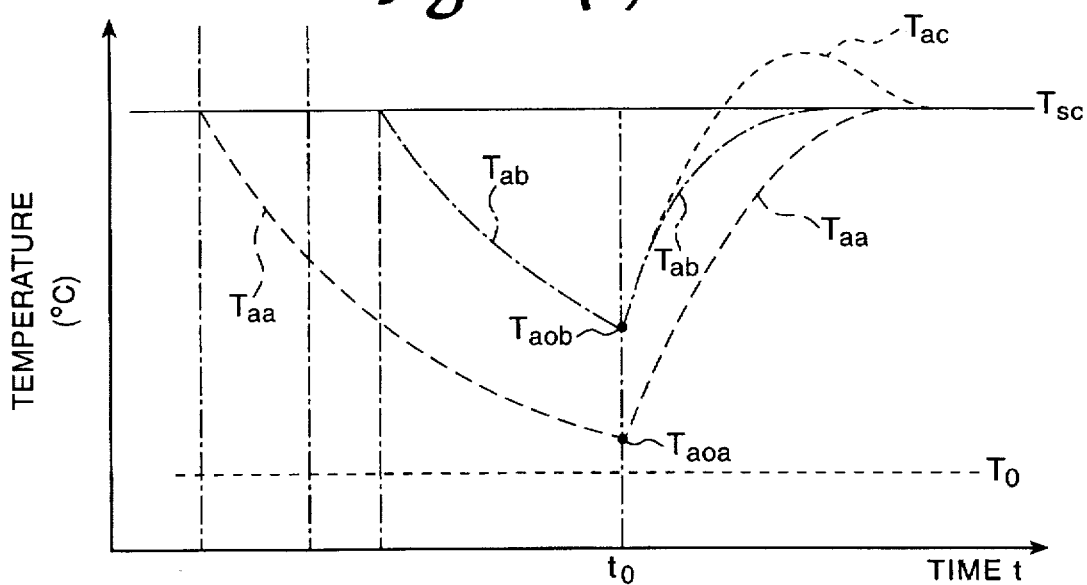
FIGS. 10(a) to 10(c) are timing charts showing the relationship between room air temperature, the air conditioner current and the air conditioner capacity when the air conditioner is controlled based on the current pattern shown in FIG. 7.
Figure 10B:
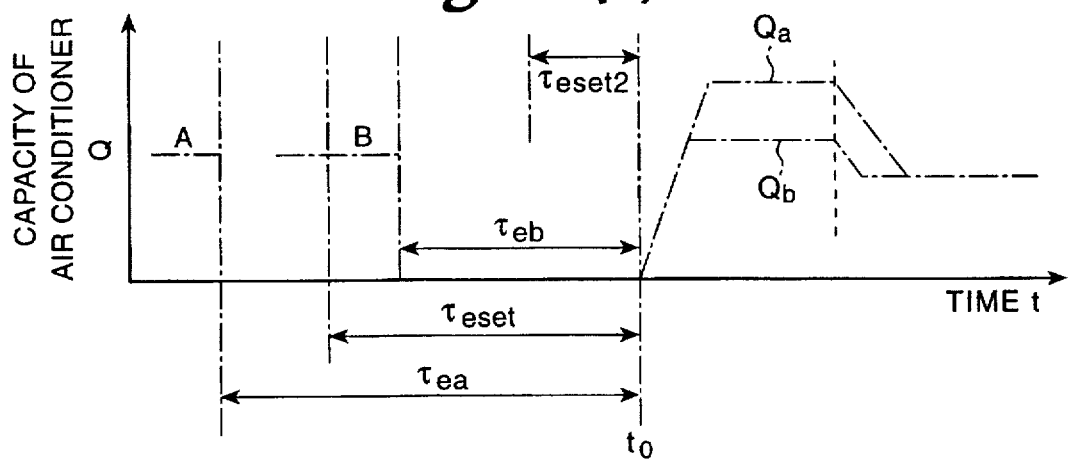
Figure 10C:
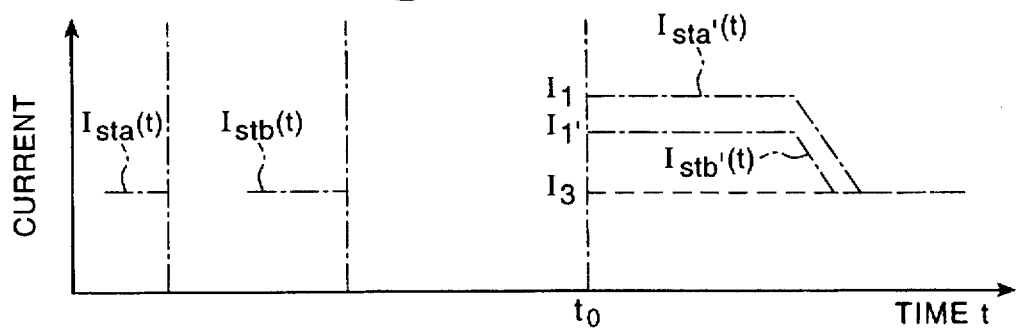
Figure 11:
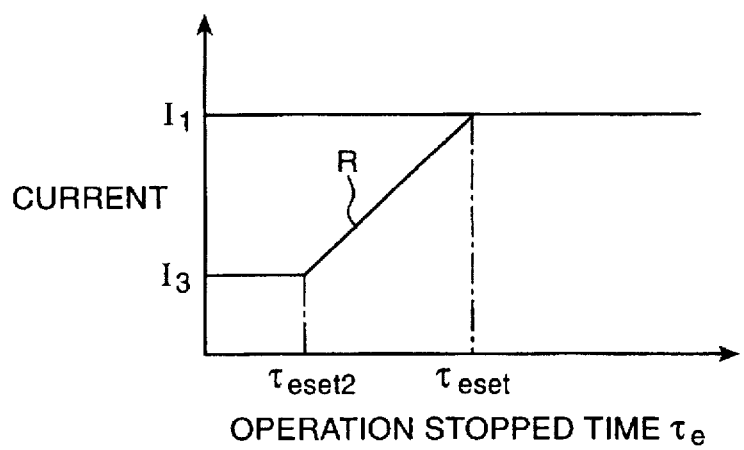
FIG. 11 is a graph showing an example of setting a target current value in the current pattern shown FIG. 7.

Then, the learned correction of maximum current value $I_1$ related to operation stopped time $\tau_e$, from the time the previous operation is stopped until the current operation is started, is performed as follows, and a new initial current pattern is set (step S513):

if $\tau_e > \tau_{eset}$, then $I_1 = I_1$ (no change)

if $\tau_{eset2} < \tau_e \leq \tau_{eset}$, then $I_1 = I_1 \times \tau_e / \tau_{eset}$ if $\tau_e \leq \tau_{eset2}$, then $I_1 = I_3$ FIGS. 10(a) to 10(c) show changes in room air temperature, the air conditioning capacity of the air conditioner and total current $I_{t1}$ practical examples of the process in step S513. In the heating mode, the operation stopped time $\tau_e$ is compared with set operation stopped times $\tau_{eset}$ and $\tau_{eset~2}$. Case A shows the case when operation stopped time $\tau_e = \tau_{ea} > \tau_{eset}$. In this case, operation stopped time $\tau_{ea}$ is comparatively long, and actual room air temperature $T_{aa}$, at the time the air conditioner starts to operate, has fallen to temperature $T_{aca}$ which is fairly close to outdoor air temperature $T_o$. Room air temperature $T_{aa}$ after the air conditioner starts to operate will not exceed set temperature $T_{sc}$, even if no particularly large adjustment is performed. However, corrections based on the previous maximum current value and its variation, or $\Delta I_{1last}$ and outdoor air temperature $k(T_o)$ is performed. That is say, the current supplied to the air conditioner is controlled under initial maximum current value $I_1 = I_{10} + \Delta I_1^* + k(T_o)$. The air conditioning capacity in case A is shown as Qa in FIG. 10(b).

Case B shows the case when operation stopped time $\tau_e = \tau_{eb} < \tau_{eset}$, $\tau_{eb} > \tau_{eset2}$. In this case, operation stopped time $\tau_{eb}$ is comparatively short. Room air temperature $T_{ab}$ at the time the air conditioner starts to operate has dropped only to temperature $T_{aob}$ which is closer to set temperature $T_{sc}$. Therefore, if an adjustment is not added to current pattern $I_{st}$ (t) at the time the next operation is started, room air temperature $T_a$ may greatly exceed set temperature $T_{sc}$, because air conditioning capacity Q will be too great, as shown by curve $T_{ac}$. Consequently, in case B, air conditioning capacity Qb is reduced (see FIG. 10(b)) so that room air temperature $T_a$ does not exceed set temperature $T_{ac}$ (see FIG. 10(a): curve $T_{ab}$). For this purpose, if $\tau_{eset2} < \tau_{eb} < \tau_{eset}$ maximum current value $I_1$ is set to the value of $I_1 \times \tau_e / \tau_{eset}$ which is smaller than $I_1$. Furthermore, if $\tau_e < \tau_{eset2}$, maximum current value $I_1$ is set to the value of $I_3$.

Therefore, when $\tau_e < \tau_{eset2}$, an adjusted current pattern $I_{st}$ (t) having a smaller maximum current value $I_1 = I_3$ is set in step S513. In this way, air conditioning capacity Q of the air conditioner is reduced in response to the air conditioner current (total current). Therefore, as shown in FIG. 10(a), room air temperature $T_a = T_{ab}$ will not exceed set temperature $T_{ac}$. Initial maximum current value $I_1$ is adjusted in accordance with curve R shown in FIG. 11 according to operation stopped time $\tau_e$ within the zone of $\tau_e < \tau_{eset}$ in step S513. Usually $\tau_{eset}$ is set to about 3 hours and $\tau_{eset2}$ is about 1 hour.

Correction of current pattern $I_{st}$ based on outdoor air temperature $T_o$ will be explained. The following variables are defined in order to define function $k(T_o)$ which depends on outdoor air temperature $T_o$.

M: Mode value. During heating mode M=+1 During cooling mode M=−1 dI: Unit amplitude of current incrementation (Absolute value. For example, dI=0.02(A))

$a_1$: Correction coefficient (integer)

C(M): Is a variable having a different value in each mode

C(+1)=0 during heating mode

C(−1)=−20 during cooling mode

Figure 12:
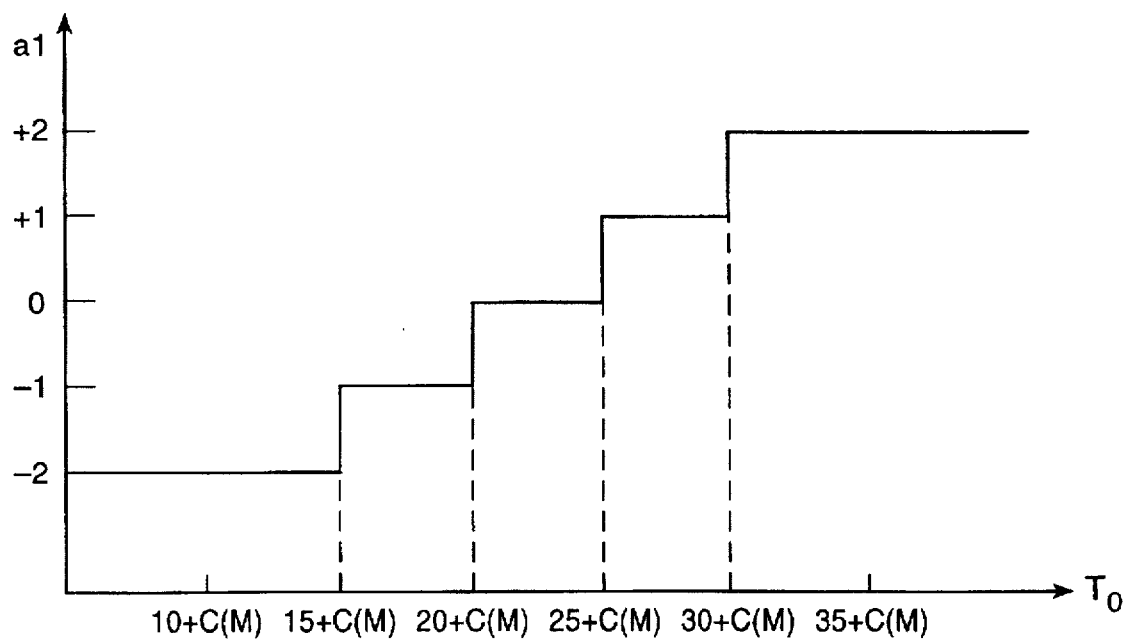
FIG. 12 is a graph showing an example of a corrected setting temperature in accordance with an outdoor temperature during a heating mode of the air conditioner.

As shown in FIG. 12, $a_1$ is taken as the following values in response to outdoor air temperature $T_o$.

$T_o \leq 15 + C(M)$: $a_1 = -2$ $15 + C(M) < T_o \leq 20 + C(M)$: $a_1 = -1$ $20 + C(M) < T_o \leq 25 + C(M)$: $a_1 = 0$ $25 + C(M) < T_o \leq 30 + C(M)$: $a_1 = +1$ $30 + C(M) < T_o$: $a_1 = +2$ Taking the above definitions as premises, the function $k(T_o)$ is defined as follows.

$k(T_o) = M \times a_1 \times dI$

The above described $k(T_o)$ is one example of a suitable function. Other functions can also be employed.

Functions $p(T_o)$ and $m(T_o)$ are also generally defined in the same way as the function $k(T_o)$. However, the constants of each of the functions $p(T_o)$, $h(T_o)$ and $k(T_o)$, such as $a_1$, are varied.

After the process in step S51 which is composed of steps S511 to S513, the ON/OFF instructions transmitted from remote controller 70 are checked (step S52).

If the operation ON is continuing in step S52, current pattern $I_{st}(t)$ and maximum current limiting value $I_{max}$ are corrected (step S53). Here, the correction of current pattern $I_{st}(t)$ is carried out in response to user commands which are input through remote controller 70. In this embodiment, setting temperature changing (▲/▼) buttons 71, 72 are used for changing not only the set temperature but also the current pattern to achieve a quick response. When the set temperature 'Raise' instruction (▲ signal) is issued by pushing ▲ button 71 or a set temperature 'Lower' instruction (▼ signal) is issued by pushing ▼ button 72, the program executes an interrupt process in step S53. Also, the set temperature is changed.

Figure 13A:
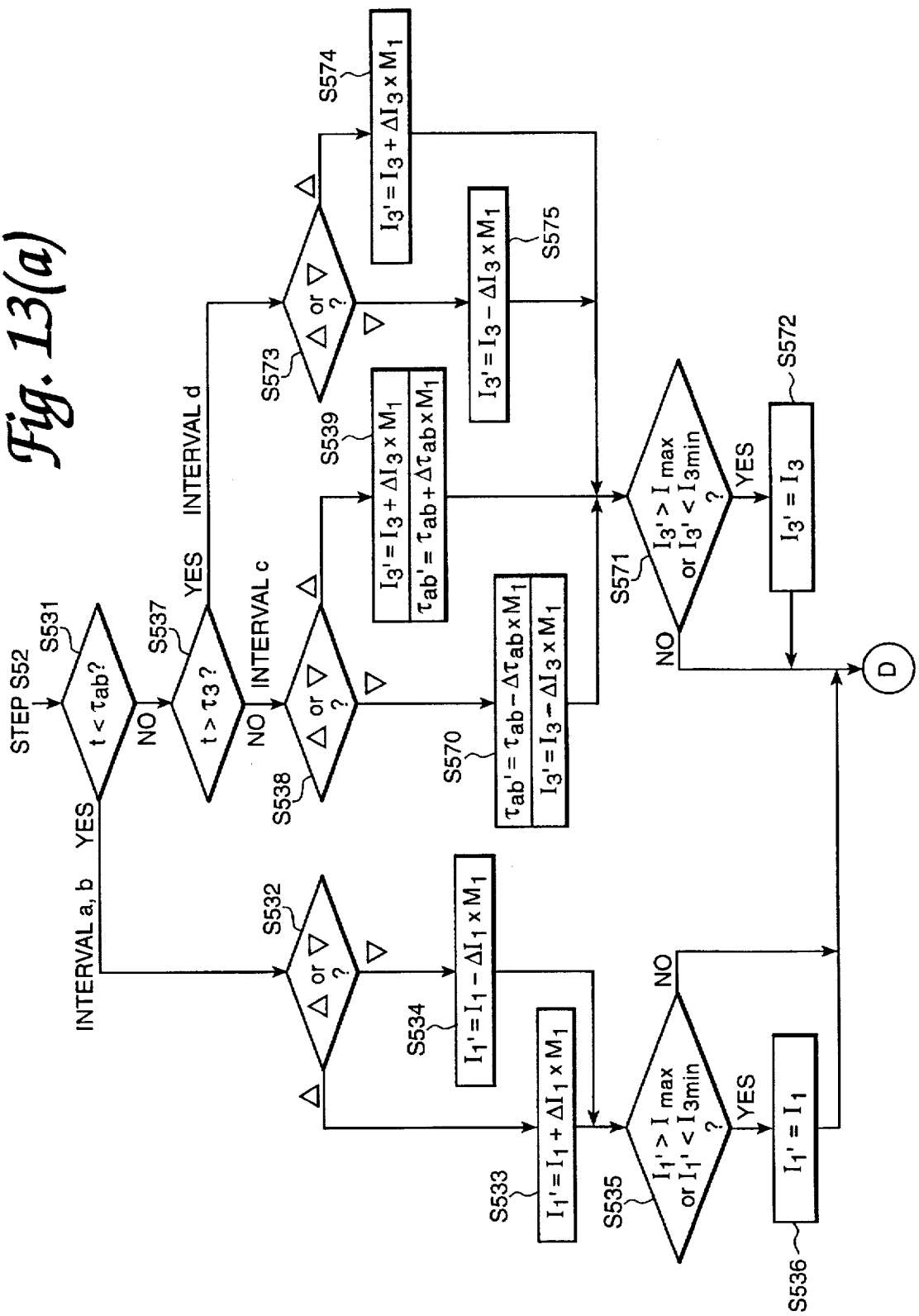
FIGS. 13(a) to 13(c) are flow charts showing a detail of step S53 in FIG. 8.

The details of step S53 will be explained referring to FIGS.13(a) to 13(c). For the program shown in FIG. 13(a), mode value M1 is to take M1=+1 in the heating mode and M1=−1 during the cooling mode. Therefore, in this case, M1=M. Thus, the number of variables can be decreased.

In step S531, whether elapsed time t from the start of operation has reached time $\tau_{ab}(=\tau_a + \tau_b)$ or not is checked. If elapsed time t has not reached $\tau_{ab}$ ($t < \tau_{ab}$), the ▲/▼ signals from remote controller 70 are checked in this interval to determine whether the user desires a further increase or a further reduction of air conditioning capacity at the present time. Therefore, when the ▲/▼ signal is inputted, the current instruction value is corrected, without changing time $\tau_{ab}$ of the interval. The program judges whether the inputted signal is the ▲ signal or the ▼ signal (step S532). If an inputted signal is the ▲ signal, then the maximum current value is corrected as $I_1'=I_1+M1\times\Delta I_1$ (step S533). If it is the ▼ signal, then the maximum current value is corrected as $I_1'=I_1-M1\times\Delta I_1$ (step S534). In these steps, $\Delta I_1$ is a unit incrementation quantity, for example 0.5(A).

Then, it is determined whether the corrected maximum current value $I_1'$ exceeds maximum current limiting value $I_{max}$, which is determined in accordance with the air conditioning system, or falls below target current value $I_3$, that is whether $I_1'>I_{max}$ or $I_1'<I_3$ (step S535). If $I_1'>I_{max}$ or if $I_1'<I_3$, the correction is canceled ($I_1'=I_1$) (step S536), and the program goes to step S580 in FIG. 13(b). In step S535, if $I_1'\leq I_{max}$ and $I_1'\geq I_3$, the program goes to step S580 without cancelling the correction.

If $t\geq \tau_{ab}$ in step S531, the program checks whether $t>t_3$ or not (step S537). During transition mode interval c, that is $\tau_{ab}\leq t\leq t_3$, in the cooling mode, ▲ button 71 on remote controller 70 is pushed to indicate the user's judgement that the air conditioning capacity is too weak (target current value $I_3$ is too small and time $\tau_{ab}$ is too short), while ▼ button 72 is pushed to indicate the user's judgement that the air conditioning capacity feels excessive (target current value $I_3$ is too large and time $\tau_{ab}$ is too long). In the heating mode, ▲ button 71 on remote controller 70 is pushed to indicate the user's judgement that the air conditioning capacity is too weak (target current value $I_3$ is too small and time $\tau_{ab}$ is too short), while ▼ button 72 is pushed to indicate the user's judgement that the air conditioning capacity feels excessive (target current value $I_3$ is too large and time $\tau_{ab}$ is too long).

Therefore, if $\tau_{ab}\leq t\leq t_3$, which means operation is in interval c, the program checks whether the inputted signal is the ▲ signal or the ▼ signal (step S538). If it is a ▲ signal, corrections of the target current value $I_3'$ and time $\tau_{ab}$ are performed as $I_3'=I_3+M_1\times\Delta I_3$, $\tau_{ab}'=\tau_{ab}+M_1\times\Delta\tau_{ab}$ (step S539).

If the inputted signal is ▼ signal, the target current value $I_3'$ and time $\tau_{ab}$ are corrected as $I_3'=I_3+M_1\times\Delta I_3$, $\tau_{ab}'=\tau_{ab}-M_1\times\Delta\tau_{ab}$ (step S570). Here, $\Delta\tau_{ab}$ is an incremented correction time for time $\tau_{ab}$, for example, about 3 minutes, $\Delta I_3$ is an incremented correction current quantity, for example 0.3(A).

Then, the program checks whether corrected target current value $I_3'$ has exceeded maximum current value $I_{max}$ or, conversely, that it is not less than minimum current value $I_{3min}$ (step S571). If the target current value $I_3'$ is not less than the minimum current value $I_{3min}$, the rotation of compressor 2 has become unstable. If $I_3'>I_{max}$ or $I_3'<I_{3min}$, the correction in step S570 or step S539 is canceled ($I_3'=I_3$) (step S572), and the program goes to step S580 in FIG. 13(b). If $I_3'\leq I_{max}$ and $I_3'\geq I_{3min}$ in step S571, the program also goes to step S580 without cancelling the correction.

If $t>t_3$ in step S537, that is, operation is in interval d after having finished the c interval, ▲/▼ buttons 71,72 on remote controller 70 can be pushed as an indication that a user requests a change in the current air conditioning capacity. In step S537, if $t>t_3$, the program checks whether the inputted signal is the ▲ signal or the ▼ signal (step S573). If it is the ▲ signal, the adjustment $I_3'=I_3+M_1\times\Delta I_3$ is executed (step S574). If it is the ▼ signal, the adjustment $I_3'=I_3-M_1\times\Delta I_3$ is carried out (step S575). Then, it is checked whether target current value $I_3'$ which has been adjusted in this way does not exceed maximum current value $I_{max}$ or, conversely, is not less than minimum current value $I_{3min}$ (step S571). If $I_3'>I_{max}$ or $I_3'<I_{3min}$, the correction is cancelled as described above ($I_3'=I_3$) (step S572). If $I_3'$ is between $I_{max}$ and $I_{3min}$, the program goes to step S580 in FIG. 13(b).

The operation of setting temperature changing (▲/▼) buttons 71, 72 can be modified from the above description as explained below. In the modification, operation of the setting temperature changing buttons 71, 72 indicates whether a current air conditioned temperature is excessive or not. Therefore, when setting temperature change (▲) button 71 is pushed, a signal as a air conditioning capacity 'Up' instruction is transmitted from remote controller 70 to control unit 60, while when setting temperature change (▼) button 72 is pushed, the ▼ signal as an air conditioning capacity 'Down' instruction is transmitted from remote controller 70 to control unit 60. Control unit 60 decrements setting room temperature $T_{sc}$ by 1(°C.) each time it receives the ▼ signal during in the heating mode or the ▲ signal during in the cooling mode, while control unit 60 decrements setting room temperature $T_{sc}$ by 1(°C.) each time it receives the ▼ signal during in the cooling mode or the ▲ signal during in the heating mode. In this modification, the changing direction of air conditioner capacity corresponds to ▲/▼ buttons 71, 72 even though the operation mode is the cooling or the heating mode. Thus, M1=+1 is always taken in the program shown in FIG. 13(a).

Figure 13B:
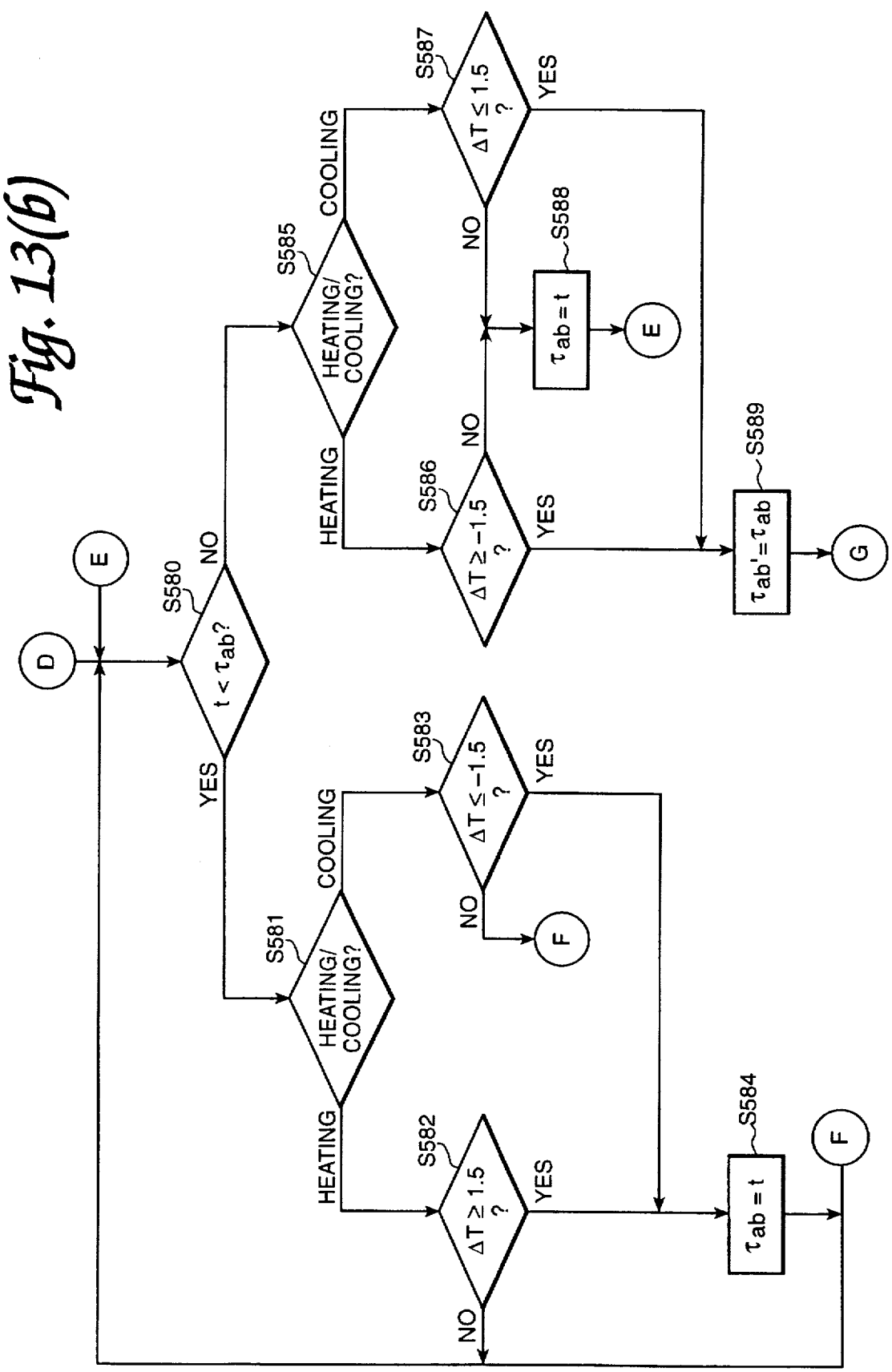

FIG. 13(b) is a sub-routine for correcting time $\tau_{ab}$ in accordance with the difference between the detected room air temperature $T_a$ and the setting room temperature $T_{sc}$, namely $\Delta T=T_a-T_{sc}$. Until learning is completed, room air temperature $T_a$ will fluctuate greatly depending on the air conditioning load. Therefore, in order to avoid this, upper and lower limit control is performed using temperature difference $\Delta T$.

Relating to elapsed time t from the start of operation, an inquiry is made of whether $t<\tau_{ab}$ or not (step S580). If $t<\tau_{ab}$, the program checks whether the air conditioning operation is in a heating mode or a cooling mode (step S581). Then, $\Delta T$ is checked (steps S582 and S583). If $\Delta T\geq 1.5$(°C.) in the heating mode in step S582 or if $\Delta T\leq -1.5$(°C.) in cooling mode in step S583, this means that the respective heating or cooling is "excessive". Therefore, the adjustment $\tau_{ab}=t$ is performed (step S584). The time $\tau_{ab}$ is shortened by this adjustment. Then, the program returns to step S580 in order to enter the interval c (the transition mode). In this case, $t_{ab}=t$, therefore the answer of the inquiry in step S580 is "NO", the program advances to step S585.

If $\Delta T<1.5$(°C.) in step S582, or $\Delta T>-1.5$(°C.) in step S583, the heating or cooling is not "excessive". Therefore, the program returns to step S580, and circulates through steps S580 to S584 until elapsed time t reaches $\tau_{ab}$ ($t\geq\tau_{ab}$).

If $t\geq\tau_{ab}$ in step S580, the program checks whether it is heating mode or cooling mode (step S585). If $\Delta T<-1.5$(°C.) in the heating mode (step S586), or if $\Delta T>1.5$(°C.) in cooling mode (step S587), that is the heating or cooling is "insufficient" for the setting room temperature $T_{ac}$. $T\tau_{ab}=t$ is carried out in order to lengthen the time $\tau_{ab}$ (step S588). Then, the program returns to step S580 and circulates through steps S580 to S588. If $\Delta T\geq -1.5$(°C.) in step S586, or $\Delta T\leq 1.5$(°C.) in step S587, which means that the heating or cooling is not "insufficient", time $\tau_{ab}'$, which is used for the next operation, is taken as $\tau_{ab}'=\tau_{ab}$ (step S589). Then, the program exits this sub-routine and goes to step S590 (FIG. 13(c)). When the adjustment $\tau_{ab}=t$ is performed in step S584, the program proceeds to step S589, passing through step S586 or S587. Therefore, time $\tau_{ab}'$ used for the next operation is shortened.

Figure 13C:
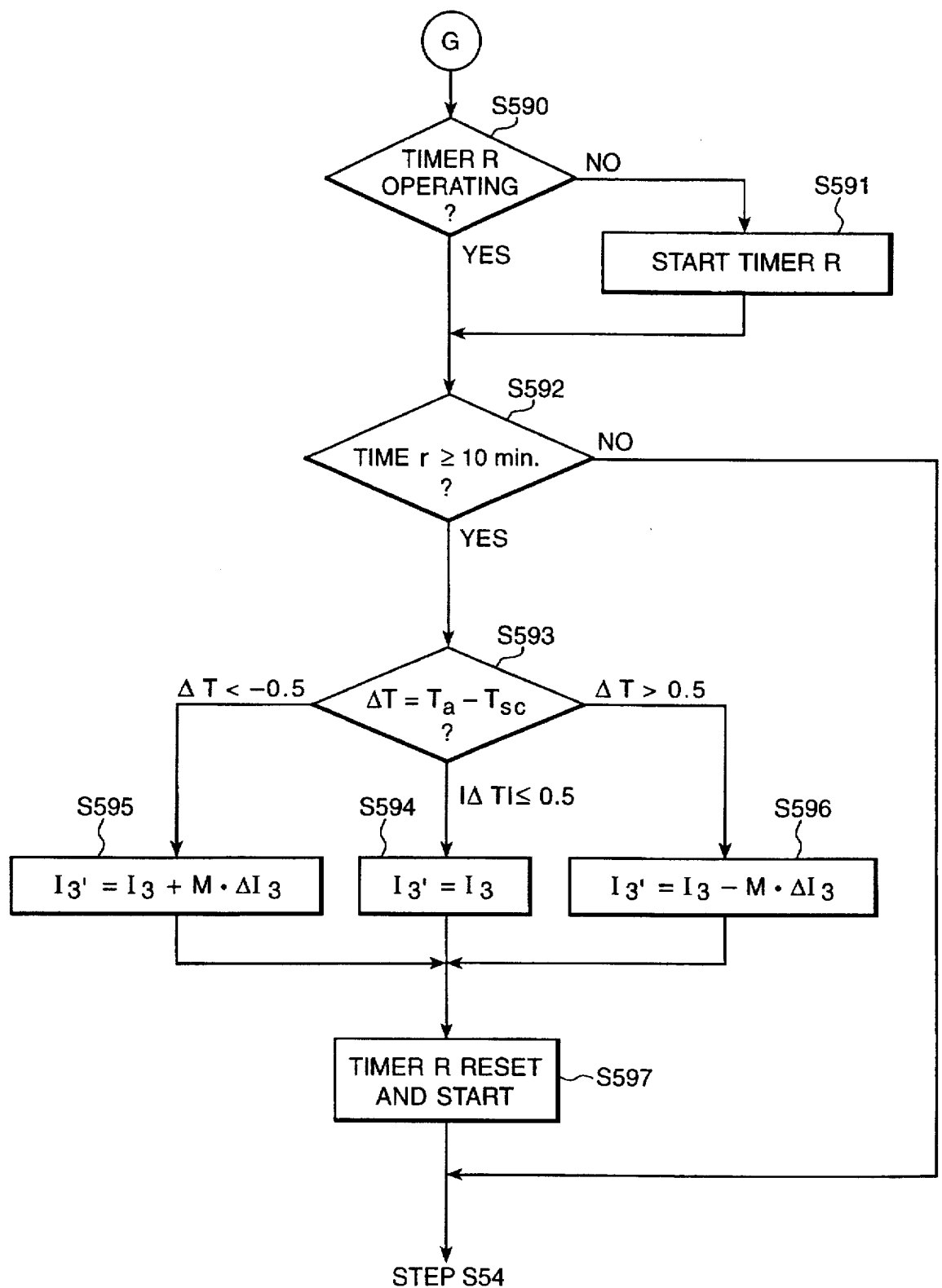

FIG. 13(c) shows a sub-routine for correcting target current value $I_3$. The correction is carried based on the air conditioning effect, that is the temperature difference $\Delta T=T_a-T_{sc}$, at constant intervals. The program determines whether timer R for detecting the constant time interval is operating (step S590). When this sub-routine is entered for the first time, timer R is not operating. Therefore, timer R is started at step S591. After step S591 or if timer R has been operating, the program determines whether time r which is counted by timer R is more than a constant time period, for example 10 minutes in this embodiment (step S592). If counted time r is more than 10 minutes, the program goes to a target current value correction process in steps S539 to S597. If counted time r is not more than 10 minutes, the program exits this sub-routine and goes to step S54. Consequently, the target current value correction which is executed by this sub-routine is carried out at 10 minute intervals.

In the target current value correction process, the program checks whether |ΔT|≦0.5, that is to say −0.5(°C.)≦ΔT≦0.5 (°C.), or not (step S593). If |ΔT|≦0.5(°C.), that is room air temperature $T_a$ is in the correct temperature zone, target current value correction is not required, and target current value $I_3'$ is taken as $I_3'=I_3$ (step S594) and the program goes to step S597.

If ΔT<−0.5(°C.) or ΔT>0.5(°C.), target current value correction is performed. In these cases, the details of the increase/decrease adjustment differs depending on the operation mode, that is the heating or cooling mode. Therefore, variable M is +1 during the heating mode and −1 during the cooling mode. If ΔT<−0.5(°C.), an adjustment process of $I_3'=I_3+M\times\Delta I_3$ is carried out (step S595). That is $I_3'=I_3+\Delta I_3$ during the heating mode and $I_3'=I_3-\Delta I_3$ during the cooling mode. Then, the program goes to step S597. If ΔT>0.5(°C.), an adjustment process of $I_3'=I_3-M\times\Delta I_3$, that is to say $I_3'=I_3-\Delta I_3$ during the heating mode and $I_3'=I_3+\Delta I_3$ during cooling mode, is carried out (step S596), then, the program goes to step S597. The incremental amplitude of the target current value is taken as $\Delta I_3$ (for example, 0.5(A)).

In step S597, timer R is reset in order to restart the constant time interval, or 10 minutes, after the processing in steps S593 to S596. The program exits this sub-routine and goes to step S54.

The above control is basically operated based on current pattern $I_{sr}(t)$. However, if the time room air temperature $T_a$ is more than 0.5(°C.) or less than −0.5(°C.) from setting room temperature $T_{sc}$, the air conditioner capacity, e.g., the compressor rotational speed, is adjusted. Typically, the setting room temperature $T_{sc}$ is set at $T_{sc}=24$(°C.) for the heating mode and $T_{sc}=27$(°C.) for the cooling mode at the factory. However, after the air conditioner in installed, a user can change the setting room temperature $T_{sc}$ by using setting temperature changing (▲/▼) buttons 71, 72.

The above described control based on user requests input from remote controller 70 can produce temperature adjustments desired by the user independent of the size, shape or characteristics of the room. That is to say, the air conditioner can produce a comfortable room condition, which may be unique for that room, as determined by the user, based on the individual user's requirements input with setting temperature changing (▲/▼) buttons 71, 72. Furthermore, differences in room size, shape and so on, and differences in individuals are gradually corrected through learning.

Actual total current $I_{t1}$ is controlled by following current instructions indicated by current pattern $I_{sr}(t)$. Hereafter, control of the air conditioner capacity or the compressor rotational speed control will be described with reference to FIG. 14 which is a detailed flow chart, or sub-routine, of step S54 in FIG. 8. Current pattern $I_{sr}(t)$ acts as the limiting value for total current $I_{t1}$ which is detected by current detector 29. The total current $I_{t1}$ includes: 1) current $I_{cp}$ of the motor driving compressor 2 (compressor motor), 2) current $I_{if}$ of of the motor driving indoor fan 7, 3) current $I_{ip}$ of control circuit 60 including the microprocessor, 4) current $I_{op}$ of the room external device such as the inverter control circuit which is included in inverter circuit 23, 5) current $I_{of}$ of the motor driving outdoor fan 9, and 6) current $I_{fv}$ for operating four-way valve operating solenoid 3S which controls four-way valve 3. That is say $I_{t1}=I_{cp}+I_{if}+I_{ip}+I_{op}+I_{of}+I_{fv}$.

The current $I_{cp}$ of the compressor motor takes up almost all of this. Consequently, as an approximation, it is usually acceptable in practice for $I_{t1}$ to be considered the same as $I_{cp}$. Therefore, a current detector for detecting the current $I_{cp}$ of the compressor motor can be used.

The basic concept of current control is that the compressor rotational speed is directly controlled and the variations of currents other than the compressor motor are gradually varied (control of the fan rotational speeds, etc., so that the rotational speed variations are also gradual). Thus, the control of the latter should be sufficiently gradual compared with the compressor rotational speed control. The value of current pattern $I_{sr}(t)$, or the set current value, is compared with the actual current value $I_{t1}$ at predetermined intervals. Then, the compressor rotational speed N is varied based on the result of the comparison so that total current $I_{t1}$ becomes $I_{t1}=I_{sr}(t)$.

Total current $I_{t1}$ which is detected by current detector 29 is compared with current pattern $I_{sr}(t)$ (step S541 in FIG. 14). If $I_{t1}\leq I_{sr}(t)$, compressor rotational speed N is increased as N'=N+dN (step S542). Here, N' is a new rotational speed to which the compressor rotational speed should be changed after this sub-routine exits. N is the present compressor rotational speed and dN is an incremented rotational speed alteration used in this sub-routine. As an example, dN=3 rps (revolutions per second) is used in this embodiment. Then, the value of flag f1 is checked (step S543). The flag f1 is set to 0 at the initial setting step (step S51) If f1=0, the program exits this sub-routine. If f1=1, the process of N'=N is performed, that is the compressor rotational speed is not changed (Step 544). Then, the flag f1 is set to 0 (f1=0) (step S545) and the program exits this sub-routine.

If $I_{t1}>I_{sr}(t)$ in step S541, the compressor rotational speed is decreased by dN (N'=N−dN) (step S548), then the flag f1 is set to 1 (step S549) and the program exits this sub-routine. In this sub-routine, the flag f1 is used for preventing a fluctuation or hunting of total current $I_{t1}$ and the compressor rotational speed. Where $I_{t1}\leq I_{sr}(t)$ in S541 right after the compressor rotational speed was decreased in step S548, if the compressor rotational speed is increased, detected current $I_{t1}$ would be increased. Then, there is a high possibility that total current $I_{t1}$ would reach $I_{sr}(t)$ or more in step S541. If so, the compressor rotational speed is decreased again. In such situation, detected current $I_{t1}$ and the compressor rotational speed fluctuate, possibly damaging compressor 2 or inverter circuit 23. Therefore, the increase in the compressor rotational speed is canceled in step S544 by setting the flag f1 to 1 in step S549, right after the compressor rotational speed is decreased in step S548. In this way, current $I_{t1}$ is controlled to less than the current instruction value according to current pattern $I_{sr}(t)$ without current and compressor rotational speed fluctuations.

After the compressor rotational speed is determined in the above way, the volume and temperature of the air emitted by the air condition are controlled (FIG. 8: step S55).

The temperature of air from indoor fan 4 is controlled to be approximately constant. To accomplish this, the indoor heat exchanger temperature $T_{ic}$ is measured by indoor heat exchanger temperature sensor 62. Instruction value $n_{sr}$ for indoor fan rotational speed $n_{if}$ is output so that temperature $T_{ic}$ remains constant (FIG. 8:step S55). Therefore, uncomfortable, excessively cool or hot air is prevented.

The temperature of air blown into the room is determined by heat exchange temperature $T_{ic}$, and the amount of air is determined by room internal fan rotational speed $n_{if}$. Room internal fan rotational speed $n_{if}$ is set in indoor fan drive circuit 25. Control unit 60 determines preferable indoor fan speed $n_{if}$, then supplies an instruction of the preferable indoor fan speed to indoor fan drive circuit 25.

When shifting from one rotational speed to another speed, the indoor fan rotational speed varies smoothly by setting the rotational speed variation rate (=rotational speed variation per unit time=$\Delta n/\Delta r$). When step S55 has been completed, the program returns to step S52 once more, and executes step S52 onward.

Figure 15:
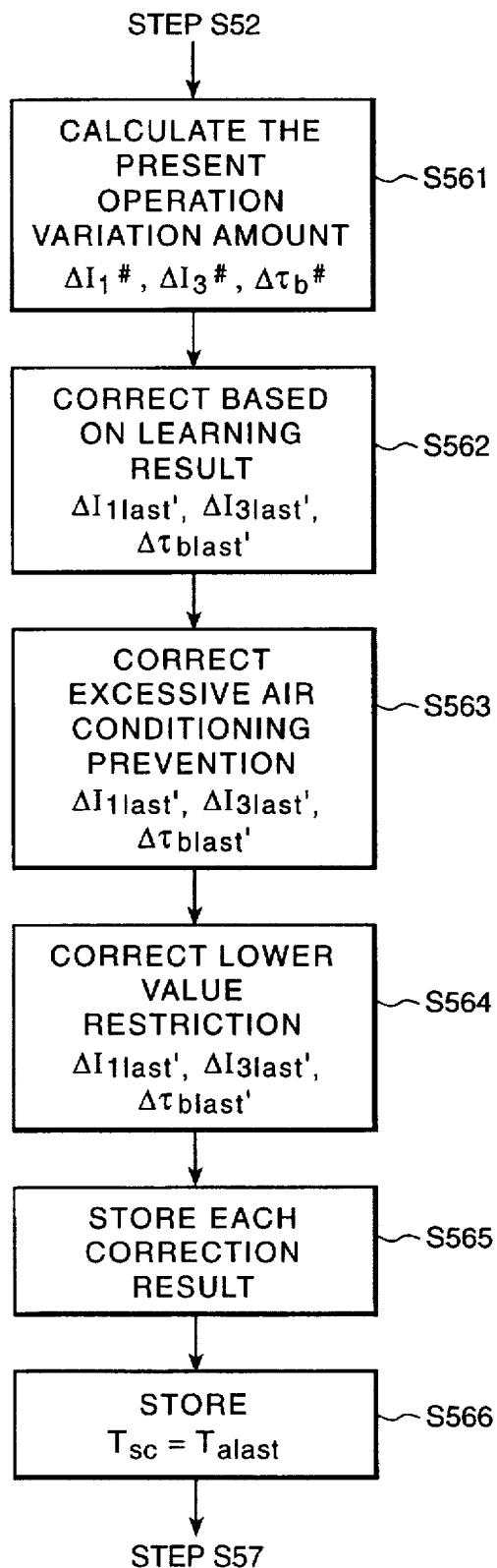
FIG. 15 is a flow chart showing a detail of step S56 in FIG. 8.

In step S52, if the OFF instruction has been received, the process of learning current pattern $I_{sr}(t)$ is executed (step S56). This learning process is described with reference to FIG. 15. In FIG. 15, suffix "'" is taken as indicating the present value, and "$_{last}$" as indicating the previous value. The present operation's current maximum value variation amount from the factory or installation setting $\Delta I_1 \#$, current target value variation amount from the factory or installation setting $\Delta I_3 \#$ and the variation amount $\Delta \tau_{ab} \#$ of time $\tau_{ab}$ from the factory or installation setting are calculated as the present operation's variation amounts, as follows (step S561). Suffix "0" at the end of the symbol in the 2nd term on the right-hand side signifies the initially set value, such as the value at the time of delivery from the factory.

$$\Delta I_1 \# = I_1' - I_{10}$$

$$\Delta I_3 \# = I_3' - I_{30}$$

$$\Delta \tau_b \# = \tau_{ab}' - \tau_{bc}$$

However, it is possible that the operation mode of the air conditioner on a certain day may be unique when compared with that on another day. In order to lessen the influence of this type of unique operation, the learning is performed taking into consideration the concept of weighting β. The weighting β is selected in accordance with the number of operations producing the same result that must be processed before those operations are considered normal. For example, by setting β=0.3, the same results must be obtained for about 3 days or operations (≈1/0.3), before those results receive full weight as normal operations. Thus, learning is performed which adds a weighting between the previous data and the present data. Such learning is performed by the calculations in step S562.

As the initial setting values for the next operation, the quantities $\Delta I_{1\ last}'$, $\Delta I_{3\ last}'$ and $\Delta \tau_{blast}'$ which reflect the present operation's amounts are found by the following equations in forms in which weighing β is taken into account in the respective present operation's variation amounts $\Delta I_1 \#$, $\Delta I_3 \#$, $\Delta \tau_b \#$, calculated in step S561, and in the variation amounts $\Delta I_{1last}$, $\Delta I_{3last}$, $\Delta \tau_{blast}$ from the previous operation (step S562).

$$\Delta I_{1last}' = (1-\beta) \cdot \Delta I_{1last} + \beta \cdot \Delta I_1 \#$$

$$\Delta I_{3last}' = (1-\beta) \cdot \Delta I_{3last} + \beta \cdot \Delta I_3 \#$$

$$\Delta \tau_{blast}' = (1-\beta) \cdot \Delta \tau_{blast} + \beta \cdot \Delta \tau_b \#$$

Next, data correction processing is performed to prevent excessive air conditioning (step S563). The reason for this processing is that if extreme values (unique values) are inputted, this is undesirable not only from the viewpoint of health, but also from the point of power consumption. Prevention of excessive air conditioning can be achieved by setting the maximum learned value. The suffix "$_{max}$" indicates the respective upper limit values which are pre-stored in control unit 60.

If $\Delta I_{1last}' > \Delta I_{1max}$, then $\Delta I_{1last}' = \Delta I_{1max}$ If $\Delta I_{3last}' > \Delta I_{3max}$, then $\Delta I_{3last}' = \Delta I_{3max}$ If $\Delta \tau_{blast}' > \Delta \tau_b$, then $\Delta \tau_{blast}' = \Delta \tau_{bmax}$ Then, data processing is performed to be sure the learning results meet lower limit value restrictions (step S564). If the present current is too small and $I_1 < I_3$, there will be a problem. This data processing is executed in order to avoid this situation. The suffix "$_{min}$" indicates the respective lower limit values which are also pre-stored in control unit 60.

First, the following three equations are calculated.

If $\Delta I_{1last}' < \Delta I_{1min}$, then $\Delta I_{1last}' = \Delta I_{1min}$ If $\Delta I_{3last}' < \Delta I_{3min}$, then $\Delta I_{3last}' = \Delta I_{3min}$ If $\Delta \tau_{blast}' < \Delta \tau_{bmin}$, then $\Delta \tau_{blast}' = \Delta \tau_{bmin}$ Then, if $\Delta I_{1last}' < (I_{30} - I_{10}) + \Delta I_{3last}'$, $\Delta I_{1last}'$ is changed based on the following equation to avoid the state $I_1 \leq I_3$.

$$\Delta I_{1last}' = (I_{30} - I_{10}) + \Delta I_{3last}'$$

Correction values $\Delta I_{1last}'$, $\Delta I_{3last}'$ and $\Delta \tau_{blast}'$ which are determined by the above corrections are stored for the initial settings for the next operation (step S565). These final correction values $\Delta I_{1last}'$, $\Delta I_{3last}'$ and $\Delta \tau_{blast}'$ are used as $\Delta I_{1last}$, $\Delta I_{3last}$ and $\Delta \tau_{blast}$ respectively, in initial setting step S511. Here, each correction value can be stored separately for every operation mode of cooling and heating. Also, a calendar may be provided and they may be stored for each season.

Finally, the processing $T_{sc} = T_{alast}$ is performed, which takes room internal temperature $T_{alast}$ at the time operation is stopped as set temperature $T_{sc}$ for the start of the next operation (step S566). The learning process of step S56 is completed and the program goes to step S57 (FIG. 8).

In step S57, operation stopped time $\tau_e$ which indicates the length of the period from the previous stop of operations ($t_4$) to the next start of operations ($t_5 = t_0$) is started. Then, the operations shown in FIG. 8 are completed.

Figure 16:
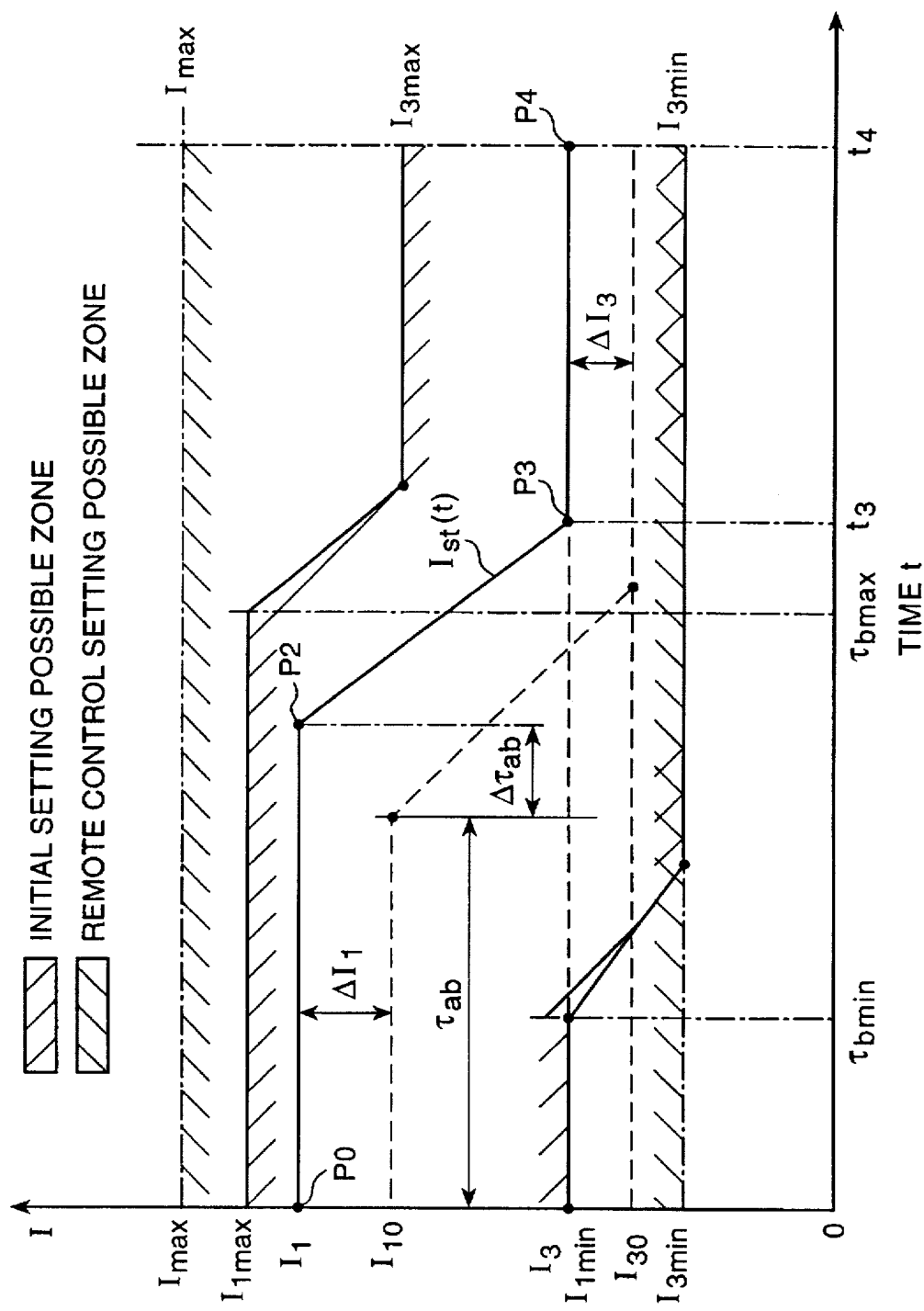
FIG. 16 is a graph of the setting current value limit controlled by step S56 shown in FIG. 8.

FIG. 16 shows possible setting limits which follow from the description of the lower value restriction processing of step S564. In FIG. 16, corrections for outdoor temperature $T_O$, that is "$k(T_o)$", "$p(T_o)$" and "$m(T_o)$" are omitted. Here, the possible initial setting limits are shown by hatching from top left to bottom right, and the possible remote control setting limits are shown by hatching from top right to bottom left. The remote controller can be used to set values only during operation. The equation $I_3 = I_{30} + \Delta I_3$, $I_1 = I_{10} + \Delta I_1$ and $I_{1min} = I_{30} + \Delta I_3$ can be observed from FIG. 16. Furthermore, FIG. 16 shows that any value may be set between maximum current limiting value $I_{max}$ and minimum current value $I_{3min}$, both of which being set at the time of delivery from the factory. These values are set by using setting temperature changing (▲/▼) buttons 71, 72 provided on remote controller 70.

To summarize, this invention can learn the results of previous operations, so that initial settings for the next operation are based on the learned result.

In this invention points P1 to P4 were set for determining the rotational speed and current patterns. However, more inflection points for pattern determination may be provided, and more detailed settings may be made.

Many changes and modifications in the above described embodiment can be carried out without departing from the scope of general inventive concept as defined by the appended claims and their equivalents.

What is claimed is:

1. A control apparatus for an air conditioner having a variable speed compressor to circulate a refrigerant in a refrigerating circuit, the control apparatus comprising:
   means for generating a rotational speed pattern for the compressor from the start of operation of the air conditioner until operation of the air conditioner is stopped;
   a controller having an operable button; and
   means for controlling the rotational speed of the compressor to follow the generated rotational speed pattern, wherein the controlling means includes means for directly changing the rotational speed of the compressor by a predetermined value in response to an operation of the operable button.

2. A control apparatus according to claim 1, wherein the controller is a remote controller.

3. A control apparatus for an air conditioner having a variable speed compressor to circulate a refrigerant in a refrigerating circuit, the control apparatus comprising:
   means for generating a rotational speed pattern for the compressor from the start of operation of the air conditioner until operation of the air conditioner is stopped, the rotational speed pattern including:
      an initial rising mode in which the compressor rotational speed is increased,
      a maximum rotational speed mode in which the compressor rotational speed is kept at a first rotational speed, wherein the first rotational speed is set as a function of an operation stopped time period which is the time from the stop of the previous operation to the start of the present operation,
      a transition mode in which the compressor rotational speed changes from the first rotational speed to a target rotational speed which is not more than the first rotational speed; and
      a target rotational speed mode in which the compressor rotational speed is kept at the target rotational speed; and
   means for controlling the rotational speed of the compressor to follow the generated rotational speed pattern.

4. A control apparatus according to claim 3, further comprises first time correcting means for correcting the time of the maximum rotational speed mode in response to the operation stopped time period.

5. A control apparatus for an air conditioner having a variable speed compressor to circulate a refrigerant in a refrigerating circuit, the control apparatus comprising:
   means for generating a rotational speed pattern for the compressor from the start of operation of the air conditioner until operation of the air conditioner is stopped, the rotational speed pattern including:
      an initial rising mode in which the compressor rotational speed is increased;
      a maximum rotational speed mode in which the compressor rotational speed is kept at a first rotational speed, wherein the first rotational speed is set as a function of a last target rotational speed in a previous operation;
      a transition mode in which the compressor rotational speed changes from the first rotational speed to a target rotational speed which is not more than the first rotational speed; and
      a target rotational speed mode in which the compressor rotational speed is kept at the target rotational speed; and
   means for controlling the rotational speed of the compressor to follow the generated rotational speed pattern.

6. A control apparatus for an air conditioner having a variable speed compressor to circulate a refrigerant in a refrigerating circuit, the control apparatus comprising:
   means for generating a rotational speed pattern for the compressor from the start of operation of the air conditioner until operation of the air conditioner is stopped, the rotational speed pattern including:
      an initial rising mode in which the compressor rotational speed is increased;
      a maximum rotational speed mode in which the compressor rotational speed is kept at a first rotational speed, wherein the first rotational speed is set as a function of a last target rotational speed in a previous operation of the air conditioner and an operation stopped time period which is the time from the stop of the previous operation to the start of the present operation;
      a transition mode in which the compressor rotational speed changes from the first rotational speed to a target rotational speed which is not more than the first rotational speed; and
      a target rotational speed mode in which the compressor rotational speed is kept at the target rotational speed; and
   means for controlling the rotational speed of the compressor to follow the generated rotational speed pattern.

7. A control apparatus for an air conditioner having a variable speed compressor to circulate a refrigerant in a refrigerating circuit, the control apparatus comprising:
   room air temperature detecting means for detecting an air temperature in a room which is air conditioned by the air conditioner;
   means for generating a rotational speed pattern for the compressor from the start of operation of the air conditioner until operation of the air conditioner is stopped, the rotational speed pattern including:
      an initial rising mode in which the compressor rotational speed is increased;
      a maximum rotational speed mode in which the compressor rotational speed is kept at a first rotational speed;
      a transition mode in which the compressor rotational speed changes from the first rotational speed to a target rotational speed which is not more than the first rotational speed, wherein the target rotational speed is set as a function of a variation of the target rotational speed which is changed by the correcting means during the previous operation of the air conditioner; and
      a target rotational speed mode in which the compressor rotational speed is kept at the target rotational speed;
   correcting means for correcting the target rotational speed in accordance with the room air temperature detected by the room air temperature detecting means; and
   means for controlling the rotational speed of the compressor to follow the generated rotational speed pattern.

8. A control method for controlling an air conditioner having a variable speed compressor to circulate a refrigerant in a refrigerating circuit, comprising the steps of:
   generating a rotational speed pattern for the time from the start of operation of the air conditioner until operation of the air conditioner is stopped;

directly changing the rotational speed of the compressor by a predetermined value in response to an operation of an operable button which is provided for the air conditioner; and controlling the rotational speed of the compressor following the generated rotational speed pattern.

9. A control method for controlling an air conditioner having a variable speed compressor to circulate a refrigerant in a refrigerating circuit, comprising the steps of:

generating a rotational speed pattern for the time from the start of operation of the air conditioner until operation of the air conditioner is stopped, the rotational speed pattern including:
- an initial rising mode in which the compressor rotational speed is increased;
- a maximum rotational speed mode in which the compressor rotational speed is kept at a first rotational speed, wherein the first rotational speed is set as a function of an operation stopped time period which is the time from the stop of the previous operation to the start of the present operation,
- a transition mode in which the compressor rotational speed changes from the first rotational speed to a target rotational speed which is not more than the first rotational speed; and
- a target rotational speed mode in which the compressor rotational speed is kept at the target rotational speed; and controlling the rotational speed of the compressor to follow the generated rotational speed pattern.

10. A method according to claim 9, further comprising the step of correcting the time of the maximum rotational speed mode in response to the operation stopped time period.

11. A method for controlling an air conditioner having a variable speed compressor to circulate a refrigerant in a refrigerating circuit, comprising the steps of:

detecting an air temperature in a room which is air conditioned by the air conditioner;

generating a rotational speed pattern for the time from the start of operation of the air conditioner until operation of the air conditioner is stopped, the rotational speed pattern including:
- an initial rising mode in which the compressor rotational speed is increased;
- a maximum rotational speed mode in which the compressor rotational speed is kept at a first rotational speed, wherein the first rotational speed is set as a function of the amount of variation of the target rotational speed in the previous operation of the air conditioner;
- a transition mode in which the compressor rotational speed changes from the first rotational speed to a target rotational speed which is not more than the first rotational speed; and
- a target rotational speed mode in which the compressor rotational speed is kept at the target rotational speed;

correcting the target rotational speed in accordance with the room air temperature detected by the room air temperature detecting means; and controlling the rotational speed of the compressor following the generated rotational speed pattern.

12. A method according to claim 11, wherein the first rotational speed is set as a function of the amount of variation of the target rotational speed in the previous operation of the air conditioner and an operation stopped time period which is the time from the stop of the previous operation to the start of the present operation.

* * * * *